(12) United States Patent
Thurman et al.

(10) Patent No.: US 10,642,573 B2
(45) Date of Patent: *May 5, 2020

(54) CONTENT STREAMING APPARATUS AND METHOD

(71) Applicant: Logitech Europe S.A., Lausanne (CH)

(72) Inventors: James L. Thurman, Washougal, WA (US); John Dittlinger, Vancouver, WA (US); William Johnson, Fremont, CA (US); Xiao Li, Sunnyvale, CA (US); Yezhou Wang, San Jose, CA (US)

(73) Assignee: LOGITECH EUROPE S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,105

(22) Filed: Mar. 18, 2019

(65) Prior Publication Data

US 2020/0027469 A1 Jan. 23, 2020

Related U.S. Application Data

(60) Provisional application No. 62/701,472, filed on Jul. 20, 2018.

(51) Int. Cl.
| | |
|---|---|
| *G06F 3/16* | (2006.01) |
| *G10L 19/16* | (2013.01) |
| *G10L 19/22* | (2013.01) |
| *H04L 29/08* | (2006.01) |
| *H04R 3/00* | (2006.01) |
| *H04R 3/12* | (2006.01) |

(52) U.S. Cl.
CPC .............. *G06F 3/165* (2013.01); *G06F 3/167* (2013.01); *G10L 19/167* (2013.01); *G10L 19/22* (2013.01); *H04L 67/10* (2013.01); *H04R 3/00* (2013.01); *H04R 3/12* (2013.01); *H04R 2420/07* (2013.01)

(58) Field of Classification Search
CPC ....... G10L 19/167; G10L 19/22; G06F 3/165; G06F 3/167; H04R 3/12; H04R 3/00; H04R 2420/07; H04L 67/10
See application file for complete search history.

(56) References Cited

U.S. PATENT DOCUMENTS

| | | |
|---|---|---|
| 5,434,617 A | 7/1995 | Bianchi |
| 6,240,303 B1 | 5/2001 | Katzur |
| 6,392,694 B1 | 5/2002 | Bianchi |
| (Continued) | | |

OTHER PUBLICATIONS

Eileen Burbidge et al. "Google Introduces New Open Format and Developer Tools for Working with BLE Beacons", Disrupt London. https://techcrunch.com/2015/07/14/google-introduces-open-format-and-developer-tools-for-bluetooth-le-beacons/.

(Continued)

*Primary Examiner* — Sonia L Gay
(74) *Attorney, Agent, or Firm* — Patterson & Sheridan, LLP

(57) ABSTRACT

Embodiments of the disclosure include an improved content streaming system that is configured to simplify and streamline the process of streaming media content from one or more content providers to one or more electronic devices. In some embodiments, the interaction of a user with one or more components in a content distribution system is used to initiate the streaming of media content to one or more content players from either a first content server or a second content server.

26 Claims, 6 Drawing Sheets

(56) References Cited

U.S. PATENT DOCUMENTS

| | | |
|---|---|---|
| 6,519,648 B1 | 2/2003 | Eyal |
| 6,587,684 B1 | 7/2003 | Hsu et al. |
| 6,611,281 B2 | 8/2003 | Strubbe |
| 6,731,334 B1 | 5/2004 | Maeng et al. |
| 6,829,391 B2 | 12/2004 | Comaniciu et al. |
| 7,133,513 B1 | 11/2006 | Zhang |
| 7,298,733 B2 | 11/2007 | Sakai et al. |
| 7,349,008 B2 | 3/2008 | Rui |
| 7,433,327 B2 | 10/2008 | Harville et al. |
| 7,876,923 B2 | 1/2011 | Finnegan et al. |
| 8,094,193 B2 | 1/2012 | Peterson et al. |
| 8,284,254 B2 | 10/2012 | Romanowich et al. |
| 8,358,328 B2 | 1/2013 | Friel et al. |
| 8,396,007 B2 | 3/2013 | Gonia et al. |
| 8,471,889 B1 | 6/2013 | Lee et al. |
| 8,547,414 B2 | 10/2013 | Sheeley |
| 8,780,168 B2 | 7/2014 | Corley et al. |
| 8,842,161 B2 | 9/2014 | Feng et al. |
| 8,872,882 B2 | 10/2014 | Shanmukhadas et al. |
| 8,885,057 B2 | 11/2014 | Mock |
| 8,913,103 B1 | 12/2014 | Sargin et al. |
| 9,001,183 B2 | 4/2015 | Mauchly |
| 9,125,138 B2 | 9/2015 | Abuan et al. |
| 9,125,146 B1 | 9/2015 | Edara et al. |
| 9,237,307 B1 | 1/2016 | Vendrow |
| 9,270,941 B1 | 2/2016 | Lavelle |
| 9,549,153 B1 | 1/2017 | Delorenzi et al. |
| 9,554,405 B2* | 1/2017 | Weel ............... G06Q 30/06 |
| 9,763,029 B2 | 9/2017 | Mirza et al. |
| 9,785,772 B1 | 10/2017 | Johansson et al. |
| 9,801,234 B2 | 10/2017 | Caine et al. |
| 9,942,661 B2 | 4/2018 | Dusse et al. |
| 10,115,396 B2 | 10/2018 | Anderson et al. |
| 10,268,759 B1 | 4/2019 | Witt et al. |
| 10,270,826 B2 | 4/2019 | Panguluri |
| 10,341,792 B1* | 7/2019 | Zhang ............... H04R 27/00 |
| 2004/0003409 A1 | 1/2004 | Berstis |
| 2005/0289224 A1 | 12/2005 | Deslippe et al. |
| 2006/0009985 A1 | 1/2006 | Ko et al. |
| 2006/0069797 A1* | 3/2006 | Abdo ............... H04L 29/06027 709/231 |
| 2006/0095339 A1 | 5/2006 | Hayashi et al. |
| 2007/0048712 A1* | 3/2007 | Plastina ............... G09B 5/06 434/308 |
| 2007/0088727 A1* | 4/2007 | Kindig ............... G06F 16/43 |
| 2008/0089268 A1 | 4/2008 | Kinder et al. |
| 2008/0192666 A1 | 8/2008 | Koskan et al. |
| 2009/0125609 A1* | 5/2009 | Wood ............... G11B 27/00 709/219 |
| 2009/0298420 A1 | 12/2009 | Haartsen et al. |
| 2010/0284389 A1 | 11/2010 | Ramsay et al. |
| 2010/0308765 A1 | 12/2010 | Moore et al. |
| 2011/0055256 A1 | 3/2011 | Phillips et al. |
| 2011/0128350 A1 | 6/2011 | Oliver et al. |
| 2011/0129048 A1 | 6/2011 | Barbe et al. |
| 2011/0158441 A1 | 6/2011 | Batra |
| 2011/0197214 A1* | 8/2011 | Burton ............... H04N 21/44218 725/13 |
| 2011/0223893 A1 | 9/2011 | Lau et al. |
| 2013/0007499 A1 | 1/2013 | Moy |
| 2013/0174223 A1 | 7/2013 | Dykeman et al. |
| 2013/0183958 A1 | 7/2013 | Wesby |
| 2013/0335508 A1 | 12/2013 | Mauchly |
| 2014/0012990 A1 | 1/2014 | Ko |
| 2014/0111600 A1 | 4/2014 | Schaefer et al. |
| 2014/0115115 A1 | 4/2014 | Kuang |
| 2014/0213227 A1 | 7/2014 | Rao |
| 2014/0274203 A1* | 9/2014 | Ganong, III ............ H04W 52/0251 455/556.1 |
| 2014/0313282 A1 | 10/2014 | Ma et al. |
| 2015/0022636 A1 | 1/2015 | Savransky |
| 2015/0156257 A1* | 6/2015 | Li ............... H04L 67/303 709/201 |
| 2015/0208352 A1* | 7/2015 | Backholm ............ H04W 52/0251 455/574 |
| 2015/0254435 A1 | 9/2015 | Fells |
| 2015/0256577 A1 | 9/2015 | Gutierrez Vilaro et al. |
| 2015/0289295 A1 | 10/2015 | Granbery |
| 2015/0326638 A1 | 11/2015 | Yarygin |
| 2015/0379021 A1* | 12/2015 | Kuper ............... G06F 16/60 700/94 |
| 2016/0132563 A1* | 5/2016 | Bhandari ............ G06F 16/24575 707/730 |
| 2016/0156992 A1 | 6/2016 | Kuper |
| 2016/0198410 A1 | 7/2016 | Cherniavsky et al. |
| 2016/0205716 A1 | 7/2016 | Wu et al. |
| 2016/0291861 A1 | 10/2016 | Song et al. |
| 2017/0041376 A1 | 2/2017 | Lin et al. |
| 2017/0064599 A1 | 3/2017 | Caine et al. |
| 2017/0244643 A1 | 8/2017 | Lawrence et al. |
| 2017/0353907 A1 | 12/2017 | Beattie, Jr. |
| 2018/0077592 A1 | 3/2018 | Kim et al. |
| 2018/0190279 A1 | 7/2018 | Anderson et al. |
| 2018/0288123 A1* | 10/2018 | Panguluri ............... G10L 13/08 |
| 2019/0028758 A1 | 1/2019 | Talvensaari et al. |
| 2020/0026486 A1 | 1/2020 | Thurman et al. |
| 2020/0027470 A1 | 1/2020 | Thurman et al. |

OTHER PUBLICATIONS

Patently Apple. Apr. 13, 2014.http://www.patentlyapple.com/patently-apple/2014/04/when-it-comes-to-ibeacon-readiness-ios-7-idevices-score-87-vs-android-devices-at-a-paltry-25.html.

Wojciech Borowicz et al. "Building Apps in the Age of Beacons and Internet of Things", Mar. 11, 2015. https://uxmag.com/articles/building-apps-in-the-age-of-beacons-and-internet-of-things/.

Sarah Perez. Robin, A Company Enabling Sensor-Powered Smart Offices, Raises $1.4 Million. Jul. 7, 2014. https://techcrunch.com/2014/07/07/robin-a-company-enabling-sensor-powered-smart-offices-raises-1-35-million/.

Ron Amadeo, "Meet Google's "Eddystone"—A Flexible, Open Source iBeacon Fighter". Jul. 14, 2015. http://arstechnica.com/gadgets/2015/07/meet-googles-eddystone-a-flexible-open-source-ibeacon-fighter/.

Home—bttn. (n.d.). Retrieved Sep. 1, 2015. <https://bt.tn/>.

Amazon.com: Dash Button. (n.d.). Retrieved Sep. 1, 2015. <http://www.amazon.com/b/?node=10667898011&lo=digital-text>.

Hue—Personal Wireless Lighting. (n.d.). Retrieved Sep. 1, 2015. <http://www2.meethue.com/en-us/the-range/hue-tap/>.

Philips solves Hue's biggest problem with new dimmer switch. (Aug. 25, 2015). Retrieved Sep. 1, 2015. <http://www.theverge.com/2015/8/25/9204523/philips-solves-hue-s-biggest-problem-with-new-dimmer-switch>.

Office Action dated Dec. 2, 2015 for U.S. Appl. No. 14/835,352.

U.S. Appl. No. 16/421,466, filed May 23, 2019.

U.S. Appl. No. 16/357,114, filed Mar. 18, 2019.

Office Action dated Sep. 9, 2019 for U.S. Appl. No. 16/421,466.

Office Action dated Aug. 7, 2019 for U.S. Appl. No. 16/357,114.

Office Action dated Dec. 4, 2019 for U.S. Appl. No. 16/357,114.

\* cited by examiner

CONTENT STREAMING APPARATUS AND METHOD

CROSS-REFERENCE TO RELATED APPLICATIONS

This application claims the benefit of the U.S. Provisional Patent Application Ser. No. 62/701,472, filed Jul. 20, 2018, which is herein incorporated by reference in its entirety.

BACKGROUND

Field

Embodiments of the present disclosure generally relate to an apparatus and method of streaming content, such as streaming media content.

Description of the Related Art

Today users have the choice to stream audio content from multiple content providers (e.g., Pandora®, Spotify®, Apple Music®, Deezer®) to one or more audio devices, such as wireless audio speakers. Users typically initiate streaming of the audio content by interacting with an application running on an electronic device, such as the smart phone. For example, to start streaming a playlist from Pandora®, the user typically launches a Pandora® application on an electronic device, selects the content, and then initiates the streaming from the electronic device. This process can be time-consuming and require several steps by the user, which can frustrate the user.

Furthermore, when the user wants to play a song or playlist from another content provider, such as Spotify®, the user typically closes the application for the first content provider (i.e., the Pandora® application), then launches the application for the second content provider, which is Spotify® in this example, then selects content from the second content provider, and then streams the content from second provider. Switching between content providers in this way may cause a gap between the stopping of the audio content streamed from the first content provider and starting of the audio content streamed from the second content provider, which can be irritating to those listening to the streamed audio content. It also requires multiple steps and the user to interact with a device that has a content provider's software running thereon.

Therefore, there is a need for an improved content streaming system to simplify and streamline the process of streaming media content from one or more content providers to one or more electronic devices.

SUMMARY

Embodiments of the disclosure provided herein include a method of streaming media content, comprising detecting, by a sensor in a first electronic device, user input, transmitting a first delivery command from the first electronic device to a second electronic device based on the detection of the user input, retrieving information regarding a first content provider from memory based on the receipt of the first delivery command, wherein the information is contained in a file containing a plurality of playlist, and the information relates to a playlist of the first content provider, transmitting, from the second electronic device, a second command, wherein the transmitted second command is directly or indirectly received by the first content provider, and the transmitted second command is derived from the retrieved information, transmitting a first portion of a first media content file to the first electronic device from the second electronic device, or from a first content server of the first content provider, based on the transmitted second command, and delivering at least a portion of the first media content file to the user from the first electronic device.

Embodiments of the disclosure may further provide a method of streaming media content that includes the following steps. First, determining, by a first electronic device, that a first user input signal received from a first content player comprises streaming command information, wherein the first user input signal was generated due to an input provided to the first content player by a user. Second, wirelessly transmitting a first delivery command to a first server after it is determined that the first user input signal includes streaming command information. Third, receiving a first information link from the first server, wherein the first information link is derived from information provided in the first delivery command. Fourth, causing a stream of information comprising at least one audio containing file contained within a first collection of two or more audio containing files to be provided from the first server or a first content server based on information contained within the first information link. Then, fifth, transferring the stream of information from the first electronic device to the first content player based on the information received in the first information link.

Embodiments of the disclosure may further provide a method of streaming media content that includes detecting, by a sensor in a first electronic device, a first user input, then transmitting a first user input signal from the first electronic device to a second electronic device based on the detection of the first user input, wherein the first user input signal comprises streaming command information. Then, receiving a first information link from the second electronic device, wherein the first information link is derived from information provided in the first user input signal. Then causing a stream of information comprising at least one audio containing file contained within a first collection of two or more audio containing files to be provided from the second electronic device or a first content server based on information contained within the first information link. Then receiving the stream of information from the second electronic device or a first content server based on the information received in the first information link, and then generating an audible signal based on the received stream of information.

Embodiments of the disclosure may further provide a method of streaming media content that includes the following steps. First, transmitting a first user input signal from a first content player, wherein the first user input signal comprises streaming command information, and the first user input signal was generated from a first input provided to the first content player by a user. Second, transmitting a first delivery command to a first content server after a control software application running on a connected electronic device determines that the first user input signal comprises streaming command information, wherein the transmission of the first delivery command is provided automatically based on receipt of the first user input signal, and the first delivery command comprises media identification information. In some cases, the process of initiating the transmission of the first delivery command is solely based on the receipt of the first user input signal. Then, third, streaming information comprising at least one media containing file that is provided from the first content server to the first content player based on information contained within the first delivery command.

Embodiments of the disclosure may further provide a method of streaming media content that includes the following steps. First, defining a first collection of media content, wherein the first collection comprises a plurality of media content files that are accessible from a first content provider. Second, storing a first information link associated with the defined first collection of media content in memory of a connected electronic device. Third, receiving a first user input signal from a first content player, wherein the first user input signal comprises streaming command information, and the first user input signal was generated from a first input provided to the first content player by a user. Fourth, transmitting a first delivery command to a first content server after a control software application running on the connected electronic device determines that the first user input signal comprises streaming command information, wherein the transmission of the first delivery command is provided based on receipt of the first user input signal, and the first delivery command comprises the first information link. Then, fifth, streaming information comprising at least one media containing file that is provided from the first content server to the first content player based on information contained within the first delivery command.

Embodiments of the disclosure may further provide an electronic device for use in a content distribution system that includes a first processor, a transceiver that is configured to receive a user input signal generated by a first content player, wherein the user input signal comprises streaming command information, and non-volatile memory. The non-volatile memory having content provider information stored therein, and also a number of instructions which, when executed by the first processor, causes the electronic device to perform operations including determining that a user input signal, received from the first content player, comprises streaming command information, wirelessly transmitting a first delivery command to a first server after it is determined that the user input signal comprises streaming command information, receiving a first information link from the first server, wherein the first information link comprises information that is used to cause the electronic device or the first content player to cause a stream of at least one audio containing file found in a collection of two or more audio containing files to be provided from the first server or a first content server, and transferring the stream of at least one containing file to the first content player based on the information received in the first information link.

Embodiments of the disclosure may further provide a method of streaming media content that includes receiving, by a connected electronic device, a first streaming command from a wireless speaker, wherein the first streaming command is provided to the connected electronic device via a first communication link, and the first communication link is a wireless communication link, determining that the first streaming command is associated with a first collection of media content, wherein the first collection of media content comprises a first playlist that is accessible from a first content provider, transmitting a request to stream the contents of the first playlist to a first content server of the first content provider, wherein the transmitted request is provided to the first content server via a second communication link, streaming at least a portion of the first playlist from the first content server to the connected electronic device via the second communication link, and streaming the at least a portion of the first playlist from the connected electronic device to the wireless speaker via the first communication link or a third communication link. In some embodiments, the streaming command can be generated based on receipt of a first input provided to the wireless speaker by a user. In some embodiments, the second communication link includes a direct connection between the connected electronic device and the first content server.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the disclosure include an improved content streaming system that is configured to simplify and streamline the process of streaming media content from one or more content providers to one or more electronic devices. In some embodiments, the interaction of a user with one or more components in a content distribution system is used to initiate the streaming of media content to one or more content players, which are also referred to herein as media devices, from a content server. One or more benefits of the disclosure provided herein include a system that has the ability to stream various forms of media content, which include various forms of video content, audio content or content that includes both audio and video content.

Figure 1:
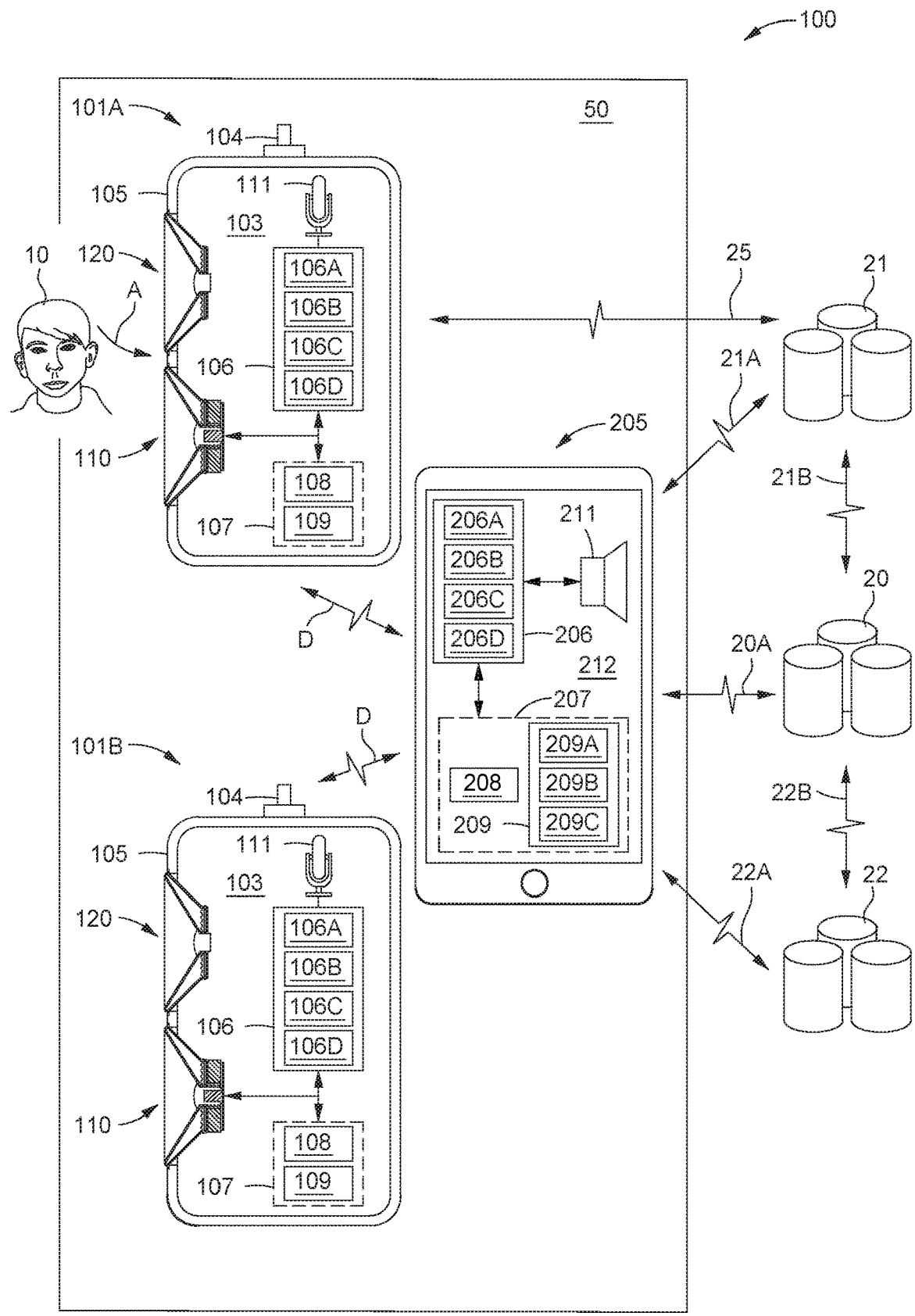
FIG. 1 is a block diagram of a content distribution system 100, according to an embodiment disclosed herein.

FIG. 1 is a block diagram of a content distribution system 100, according to one embodiment disclosed herein. The content distribution system 100 includes a first media device 101A, a connected electronic device 205, a first server 20, a first content server 21, and a second content server 22. The first server 20 can be an Internet accessible server used to interface with at least one of the content servers 21, 22. Each content server 21, 22 can be an Internet accessible server of a different content provider (e.g., Pandora®, Spotify®, Netflix®). In one example, one or more of the content providers are a remote music service, such as Apple Music®, Spotify®, SoundCloud®, Prime Music®, Deezer®, Pandora® or other streaming music service. Although two content servers 21, 22 are shown, the content distribution system 100 could be expanded to include more than two content servers, such as ten content servers or twenty content servers, etc. Furthermore, the content distribution system 100 could include two media devices 101, such as the first media device 101A (first content player) and a second media device 101B (second content player). In some embodiments, the content distribution system 100 could include more than two media devices.

During operation, a user can interact with the content distribution system 100 to initiate the streaming of media content (e.g., a playlist) to one or more of the media devices 101 from either the first content server 21 and/or the second content server 22 by providing a single user input. The received single user input can be in the form of a physical input, an optically generated input or an audible input that can be sensed by an input sensing device and is generally easy for the user to provide to the media device 101. In some cases, the input sensing device can be a device that is adapted to receive a physical input, a sound receiving device (e.g., microphone) that is able to detect an audible input, or an optical radiation detector that can be configured to detect the radiation from a light source and/or lack of radiation emitted from the light source. In some embodiments, the input sensing device used to sense a physical input includes an electromechanical device, such as a mechanical switch, electronic switch, potentiometer, touch sensor (e.g., resistive, capacitive or piezoelectric switch) or other similar device that is configured to sense a user's physical interaction with the input sensing device. While not intending to limit the scope of the disclosure provided herein, and for simplicity of discussion, throughout the discussion provided below an input sensing device used to sense a user's input is described as a button 104. Unless otherwise specified in the following disclosure, the term "button" can include an electromechanical device that is used to detect and generate a user input signal based on user generated input. In FIG. 1, the input sensing device, or button 104, is schematically illustrated as being positioned on the top of each of the media devices 101A, 101B. In the content distribution system 100, the user can interact with or press the button 104 to initiate streaming of media content from one or more of the first content server 21 and the second content server 22. The generated signal and duration that the signal was generated (e.g., button was pressed for 3 seconds) by the user's interaction with the button 104 can be detected and used by one or more of the components in the processing system 106 of the media device 101 to perform some desired activity, which is discussed further below.

In this example, the media device 101 on which the button 104 is pressed can cause a signal to be sent from that media device 101 to the connected electronic device 205. Upon receiving that signal, the connected electronic device 205 can contact the first content server 21 or the second content server 22, through a communication link 21A or 22A, respectively, based on the user's selection of the media content (e.g., a playlist) to be streamed when the button 104 is pressed. In some configurations, the connected electronic device 205 can contact the content servers 21 or 22 indirectly through the first server 20 using a communication link 20A and an interconnecting communication link 21B or 22B. In general, the communication links 20A, 21A and 22A and interconnecting communication links 21B and 22B can wired or wireless communication links. The user selection of the media content to be streamed when the user presses the button 104 on a media device 101 can be selected using a control software application 209A, or simply referred to herein as a control application 209A (described in more detail below). As one example, the control application 209A can be used to cause a first playlist from a first content provider to be streamed to the media device 101 on which the button 104 is pressed and then seamlessly continue to play a second playlist from a second content provider after the first playlist from the first content provider is played.

In some embodiments, a simpler configuration of the content distribution system 100 may include only the first media device 101A, the connected electronic device 205, and the first content server 21. For example, some of the benefits of the embodiments described herein may be accomplished without including the first server 20, the second content server 22, and/or the second media device 101B. For example, the first media device 101A can play the media content, such as at least a portion of a media content file (e.g., music from Pandora®, Deezer® or Spotify®, video from Netflix®, etc.), receive from the first content server 21 of the first content provider when the user presses the button 104 on the first media device 101A by having the first media device 101A communicate with the connected electronic device 205, which can then communicate directly with the first content server 21 via the communication link 21A to cause media content (e.g., a first playlist from the first content provider) to be streamed to the first media device 101A. The first media device 101A can communicate with the connected electronic device 205 using a device communication link "D", which can be a wired or wireless communication link (e.g., Bluetooth). The first content server 21 can communicate with the first media device 101A directly via a wired or wireless communication link 25, or indirectly via the connected electronic device 205 using the communication link 21A and the device communication link "D". The information transferred between the first media device 101A and the connected electronic device 205 across the device communication link "D" when the user presses the button 104 can include a user input signal that includes streaming command information. The streaming command information can include an initiate playlist streaming command, device ID information (e.g., audio device identification information, serial number, model number, software version, etc.) or other useful information. The initiate playlist streaming command can include information or instructions that the control application 209A uses to decide to initiate the streaming process and/or which media content to deliver to the first media device 101A.

As will discussed further below, once the connected electronic device 205 has received an initiate streaming command from the first media device 101A, the control application 209A running on the connected electronic device 205 can send a delivery command to the first content server 21 via the communication link 21A. The delivery command can include media identification (media ID) information, content provider information (e.g., Pandora®, Deezer®, Spotify® or Netflix® information), content provider login information, device authentication information and/or other information needed to initiate the streaming of the media from the content provider. Media ID information will include a content provider's identification information relating to the media content that is desired to be streamed, such as media identification information relating to one or more specific playlists, one or more songs, and/or one or more media content files. In some embodiments, the delivery command includes one or more information links, for example one or more uniform resource locators (URL), uniform resource identifiers (URI), or other types of information links that at least reference media ID information and content provider information. The generation and transmission of the delivery command by the control application 209A can be completed automatically (e.g., without any, or the need for any, further user input) based on the receipt of an initiate streaming command.

Additionally, the first media device 101A and the connected electronic device 205 can be configured to stream local content stored on the connected electronic device 205 when the button 104 is pressed. The ability to stream local content can be completed without the need to use of a content server, and thus can be a simpler configuration of the content distribution system 100.

Furthermore, in one embodiment, the first server 20 can be omitted, and the connected electronic device 205 can directly contact at least one of the content servers 21, 22 to initiate streaming of the media content to one or more of the media devices 101. Additionally, in some embodiments, the connected electronic device 205 can act as a mobile hotspot allowing the media devices 101 to access the Internet, so that the media content from the content servers 21, 22 can be streamed to one or more of the media devices 101.

In some embodiments, the servers 20-22 may each be an Internet accessible server. The first server 20 can store settings (e.g., the settings from the control application 209A) that control how media content is streamed to the media devices 101 when the button 104 is pressed on one of the media devices 101. For example, the first server 20 can store settings that cause a first playlist, stored within the first content server 21, to be streamed to the first media device 101A when the button 104 on the first media device 101A is pressed. In some embodiments, the first server 20 can further act as a hub passing information between the connected electronic device 205 and the content servers 21, 22 to at least initiate the streaming of the media content to the media device 101. Furthermore, in some embodiments, one or more of the media devices 101 can perform at least some communication, via a hub communication link (not shown for clarity of illustration), with the first server 20 without use of the connected electronic device 205, so the first server 20 can further act as a hub passing information between the media devices 101 and the content servers 21, 22. For example, when the user presses the button 104 on the first media device 101A, the initial communication to the first server 20 can occur through the connected electronic device 205, but the actually streaming of the media content can occur using a communication path that does not include the connected electronic device 205 and the first server 20, such as a communication path (e.g., wired or wireless communication link 25) between the first media device 101A and the and the first content server 21.

The first server 20 can further include software and settings, which are stored in a non-volatile memory therein, that are used for contacting the content servers 21, 22 to initiate the streaming of the media content to one or more of the media devices 101. For example, the first server 20 can store the user's account information (e.g., username and password) for each of the content providers delivered from the content servers 21, 22 to assist in initiating the streaming of the media content therefrom. Thus, when instructed by the connected electronic device 205, or the first media device 101A, the first server 20 can send a delivery command to either of the content servers 21, 22 via a communication link 21B, 22B, respectively, to initiate the streaming process to the first media device 101A.

The media devices 101 and the connected electronic device 205 can be located in a first environment 50. The first environment 50 can be a house, a building, an outdoor area, or other area in which the media devices 101 can communicate with the connected electronic device 205 without use of the Internet. For example, in some embodiments, each media device 101 can communicate with the connected electronic device 205 over a direct communication link D, such as a personal area network, such as Bluetooth® connection (e.g., BTLE, Bluetooth classic), or a local area network connection. Furthermore, as discussed above, in some embodiments, each media device 101 and the connected electronic device 205 can communicate with Internet accessible devices, such as the servers 20-22. For example, as shown in FIG. 1, the media devices 101 and the connected electronic device 205 can be connected to the servers 20-22 through a communication link, such as communication link that includes an Internet connection. In one embodiment, a Wi-Fi modem (not shown) in the connected electronic device 205 can be used to connect the media devices 101 to the Internet accessible servers 20-22. In another embodiment, the connected electronic device 205 can include a cellular transceiver, such as a GSM, CDMA, GPRS, and fourth generation (4G) telecommunication transceiver to form a communication link (e.g., communication links 20A, 21A and/or 22A) that is used to independently access the Internet and allow the media devices 101 to access the Internet through the connected electronic device 205.

Furthermore, as discussed above, the first server 20 can be connected to the content servers 21, 22 through separate Internet connections formed by the communication links 21A, 22A, respectively. In some embodiments, when the user presses the button 104 on one of the media devices 101, the connected electronic device 205 receives a user input signal from that media device 101 and then send a delivery command to initiate streaming media content to the first server 20, which can then contact the content server 21, 22 to initiate the streaming of the desired media content. In some embodiments, upon receipt of the delivery command one or more software applications running on the content server 21, 22 will initiate the streaming of the selected media, which was identified in the information contained within the delivery command, to the first media device 101A. The selected media can be streamed to the first media device 101A either directly or indirectly through the first server 20 and/or the connected electronic device 205.

Alternately, in some embodiments, the content server 21, 22 receiving the delivery command from the first server 20 can then transmit one or more information links, for example one or more uniform resource locators (URL), uniform resource identifiers (URI), or other types of information links that reference a connected media content providing external resource, to the first server 20. The first server 20 can then transmit the received link to the media device 101 on which the button 104 was pressed, for example by transmitting the link through the connected electronic device 205, so that the media device 101 can begin to directly stream the media content. In other embodiments, the first server 20 transmits the received link to the connected electronic device 205, which can then initiate streaming of the media content to the media device 101, for example using the communication link 21A (e.g., internet connection) and the direct communication link D. Streaming through the connected electronic device 205 can be useful when a separate Internet connection without the connected electronic device 205 is unavailable.

Media Device Example

The media devices 101A, 101B (also sometimes referred to herein as audio device(s)) are one example of a content player that may be used in the content distribution system 100, and may include a wired speaker, a wireless speaker (e.g., a standalone wireless speakers, wireless headphones, wireless earbuds, wireless earphones), an internet radio, a mixed media player or other similar content playing device. In other embodiments, the content player can be another electronic device that is capable of receiving input from a user 10 and deliver media content (e.g., audio and/or visual media) to the user 10.

The media device 101 includes an audio device that includes a housing 105, an active speaker assembly 110, and a passive speaker assembly 120. The housing 105 of the media device 101 encloses an interior region 103 of the media device 101. The active speaker assembly 110 can include typical speaker components, such as a voice coil (not shown) coupled with a permanent magnet (not shown) for generating sound when an electrical signal is provided to the voice coil. The passive speaker assembly 120 (e.g., a passive radiator) can move in response to the changes in air pressure of the interior region 103 caused by the movements of the active speaker assembly 110 to enable the media device 101 to produce a higher quality sound.

The media device 101 may further include a memory 107, a processing system 106, and a microphone 111. The memory 107 may contain stored data 108 and one or more software applications, such as a software program 109. The processing system 106 can typically include input/output (I/O) hardware 106A, a processor 106B, a first transceiver 106C, and a second transceiver 106D. The I/O hardware 106A may be connected to inputs, such as the button 104, the microphone 111, as well as one or more other inputs, such as switches and sensors included in the media device 101. In some embodiments, for simplicity of manufacturing and reduced device complexity, the button 104 includes a switch that is able to sense input provided by a user by the opening and closing of electrical contacts (e.g., mechanical switch). In one embodiment, the I/O hardware 106A further includes other inputs such as a separate power button and a separate play/stop button, which each may include a switch.

The I/O hardware 106A may further be connected to outputs, such as one or more status indicators (e.g., LEDs) and the active speaker assembly 110. The processor 106B may include a central processing unit (CPU), a digital signal processor (DSP), and/or application-specific integrated circuits (ASIC), and other useful components.

The first transceiver 106C can be a wireless transceiver configured to communicate on a local area network to allow the media device 101 to communicate with the Internet. For example, the first transceiver 106C can be a Wi-Fi transceiver (e.g., IEEE 802.11 a,b,g,n) configured to access the Internet through a wireless access point, such as a Wi-Fi modem (not shown), via a communication link (e.g., wireless version of communication link 25). Through execution of the software program 109, the first transceiver 106C can be used to enable the media device 101 to communicate with one or more of the first server 20, the first content server 21, and the second content server 22 when a Wi-Fi network is available. The second transceiver 106D can be a wireless transceiver configured to communicate on a personal area network, such as Bluetooth® transceiver (e.g., BTLE, Bluetooth classic). The second transceiver 106D can be used to communicate with the connected electronic device 205 allowing the connected electronic device 205 to configure, control and/or monitor the streaming of media content to the media device(s) 101. However, in some embodiments, the media device 101 may communicate with the connected electronic device 205 using the first transceiver 106C and a corresponding transceiver 206C on the connected electronic device 205. In some other embodiments, the media device 101 may additionally or alternately be configured to communicate with other types of external electronic devices, such as a cellular modem, broadband modem, wireless router or other similar device, using the first transceiver 106C and a corresponding transceiver found within the external electronic device. Furthermore, the media devices 101A, 101B can communicate with each other using corresponding first transceivers 106C or second transceivers 106D.

The memory 107 may be any technically feasible type of hardware unit configured to store data. For example, memory 107 could include some form of non-volatile memory, such as a hard disk, a random access memory (RAM) module, a flash memory unit, or a combination of different hardware units configured to store data. Software program 109, which is stored within the memory 107, includes program code that may be executed by processor 106B in order to perform various functionalities associated with the media device 101.

The stored data 108 may include any type of information that relates to the configuration or control of the media device 101, device data (e.g., a unique identifier that can be used to identify the first media device 101A relative to other media devices, such as the second media device 101B), useful software applications, or other useful information. In some embodiments, the stored data 108 may include information relating to one or more software applications or tasks being performed by one or more of the software applications stored with the memory 107. The stored data 108 may reflect various data files, settings and/or parameters associated with communicating with the connected electronic device 205 and/or one or more of the servers 20-22 in the content distribution system 100. In some embodiments, the stored data 108 may also include various data files, settings and/or parameters associated with a user's preferences or other user information (e.g., streaming account information) useful or required to communicate with the one or more of the servers 20-22 in the content distribution system 100.

Connected Electronic Device

The connected electronic device 205 described herein may be a smart phone, but other connected electronic devices may be used. For example, the connected electronic device 205 can be a cell phone (e.g., smart phone), a tablet computing device, laptop computer or other similar electronic device. Examples of a connected electronic device 205 may include, but are not limited to an iPhone®, iPad®, Android™ phone, Samsung Galaxy®, Microsoft Surface®, laptop or other similar device. The connected electronic device 205 may be used to configure, control and/or monitor the streaming of media content, such as at least a portion of a media content file (e.g., music from Pandora®, Deezer® or Spotify® or video from Netflix®, etc.), to the media devices 101. Furthermore, in some embodiments, the connected electronic device 205 may be replaced with a stationary electronic device, such as a desktop computer.

The connected electronic device 205 includes a processing system 206 and memory 207, which may contain stored data 208 and one or more software applications 209, such as a control application 209A, a first content provider software application 209B (e.g., a Pandora® application for streaming media content from Pandora®), and a second content provider software application 209C (e.g., a Spotify® application for streaming media content from Spotify®). The control application 209A can be used to arrange one or more collections of media content containing files (e.g., collection of songs and/or playlists) from one or more content providers to be streamed by one or more of the media devices 101 when the user provides a single input, such as pressing the button 104 on the first media device 101A. In some embodiments, the user can store collections of audio content, or also referred to herein as audio containing files, on the first server 20, a content server 21, 22 or on a particular electronic device (e.g., connected electronic device 205). Storing these collections of audio content on the first server 20 can enable the user to access and modify these collections of audio content on different electronic devices. Furthermore, the user can store collections of video content including video, such as a daily video program, such as a daily news program by having at least one of the media devices 101 replaced with an electronic device having a display capable of streaming and displaying video. The media content can include video that includes visual images and audio content.

In one embodiment, the user can arrange a first collection of media content and a second collection of media content using the control application 209A. The first collection of media content may include a first playlist from a first content provider and a second playlist from a second content provider. The user can designate the first collection as the selected media content to be streamed when the user provides a single user input (i.e., pressing the button 104). Subsequently, if the user prefers to have a second collection of media content to be streamed when the single input is provided, the user simply switches the collection that is currently designated as the selected media content (e.g., first collection) to be streamed as the second collection using a setting in the control application 209A.

The control application 209A (e.g., Software Development Kit (SDK)) is generally configured to communicate with and transfer information between various other software applications, such as a content provider's software application 209B, 209C (e.g., SDK). In one embodiment, the control application 209A is able to access and select a desired collection of media content (e.g., audio content) using a content provider software application 209B, 209C. In another embodiment, the control application 209A is able to receive or retrieve information regarding the collection of media content from a content provider software application 209B, 209C. In either case, the control application 209A can cause one or more uniform resource locators (URL), uniform resource identifiers (URI), or other types of information links to be stored in memory. The uniform resource locators (URL), uniform resource identifiers (URI), or other types of information links are configured to allow access to the media content that is stored on and can be streamed from the content server of the content provider.

In some embodiments, the control application 209A is configured to deliver a first request to stream the contents of a first playlist to a content provider software application 209B, 209C running on the connected electronic device, wherein the delivery of the first request to stream the contents of the first playlist is initiated by a control software application 209A running on the connected electronic device. The content provider software application 209B, 209C is then used to transmit the first request to stream the contents of the first playlist to the first content server so that the contents of the first playlist can be streamed from the content server of the content provider to the connected electronic device 205 or the media device 101.

Furthermore, the user can use the control application 209A to configure how the media content will be streamed to the available media devices 101A, 101B. For example, the user can use the control application 209A to configure a preferred playback configuration, such as setting the first media device 101A as the preferred audio device for streaming the selected media content when the button 104 is pressed on the first media device 101A, the second media device 101B as the preferred audio device for streaming media content when the button 104 is pressed on the second media device 101B, or have both media devices 101A, 101B play the media content streamed when the button 104 is pressed on one or more of the media devices 101A or 101B.

Additionally, the preferred playback configuration may include additional media devices that do not require user input to initiate streaming, such as pressing the button 104 on an media device 101. For example, the playback configuration may be arranged so that the media content is streamed to the first media device 101A as well as to a plurality of additional media devices (not shown) that are in communication with one or more of the first media device 101A and the connected electronic device 205. The control application 209A can be configured to generate media information that can be used to display a graphical representation of all of the available media devices to the user using a display device (e.g., a screen on the connected electronic device 205). The control application 209A can further be configured so that the user can quickly select, or the control application 209A can be configured to automatically select, all available media devices or all available media devices having certain characteristics, such as being of a particular device type (e.g., all Logitech UE Boom® speakers), or being capable of receiving streaming wireless audio, etc. The control application 209A can further be configured to allow the user to place media devices in groups. For example, the user may place five speakers in a "Party" group, select the "Party" group as the devices to play the streamed media content when the button 104 is pressed on the first media device 101A, and then the speakers in the "Party" group can stream the media content when the button 104 is pressed on the first media device 101A. Furthermore, the groups can be configured to include or not include the audio device on which the button 104 was pressed.

In some embodiments, when the button 104 is pressed on a given media device 101, the media device 101 or the connected electronic device 205 can further be configured to send a power "on" signal or a "wake-up" signal to other media devices, such as other media devices in a selected group or all available media devices, so that these other media devices are ready to play the streamed media content after the button 104 is pressed.

In certain embodiments, an media device 101 can act as a relay for audio data. For example, media device 101A may receive an audio stream from electronic device 205 and stream the received audio stream to additional media devices, such as those within an aforementioned "Party" group. Media device 101A can, in response to button 104 being pressed, send a command for other media devices within a group to power on and/or receive a respective audio stream from media device 101A. The streaming of audio data to additional media devices by an media device 101A or electronic device 205 can be based on preselected user-selected media devices within a group, by a user-selected option stored within the connected electronic device 205, and/or by attributes of media devices that can be used by connected electronic device 205 and/or media device 101A to automatically connect to, power on, and/or stream media content to media devices.

The processing system 206 of the electronic device 205 can include input/output (I/O) hardware 206A and a processor 206B, which may include a central processing unit (CPU), a digital signal processor (DSP), and/or application-specific integrated circuits (ASIC), and other useful components. The I/O devices, which may be connected to the I/O hardware 206A within the connected electronic device 205 may include a speaker 211, a display device 212, a touch sensing device (not shown), a first transceiver 206C, and a second transceiver 206D.

The first transceiver 206C can be a wireless transceiver configured to communicate on a personal area network, such as Bluetooth® transceiver (e.g., BTLE, Bluetooth classic). The first transceiver 206C can be used to communicate with one or more of the media devices 101 allowing the connected electronic device 205 to initiate the streaming of the media content when the user provides the single input (i.e., pressing the button 104) on one of the media devices 101A, 101B. Although the first transceiver 206C is described as a Bluetooth® transceiver, in other embodiments the first transceiver 206C can be another type of transceiver, such as another type of RF transceiver (e.g., a Near Field Communication transceiver) or an infrared transceiver. The second transceiver 206D can be a transceiver used to access the Internet, such as a Wi-Fi transceiver (e.g., IEEE 802.11 a,b,g,n) or a cellular transceiver, such as a GSM, CDMA, GPRS, and fourth generation (4G) telecommunication transceiver. For example, the second transceiver 206D can be a cellular transceiver configured to access the Internet via a communication link (e.g., communication link 20A, 21A or 22A). In another example, the second transceiver 206D can be a Wi-Fi transceiver configured to access the Internet through a wireless access point, such as a Wi-Fi modem (not shown) via the communication link 20A, 21A or 22A.

The control application 209A can be used to interact with the media device 101 and one or more of the servers 20-22. For example, in one embodiment, the control application 209A can send a command to the first server 20 to contact one of the content servers 21, 22 to obtain a link that can be used to stream the media content from the content server. In another embodiment, the first server 20 is not used, and the connected electronic device 205 uses the control application 209A to directly contact one of the content servers 21, 22 to begin streaming the media content from the content server.

Software applications, such as control application 209A, may include software applications that are configured to run in the foreground and/or background on the connected electronic device 205. For example, much of the functionality of the control application 209A can operate in the background of the connected electronic device 205 without any direct interaction from the user, so that the control application 209A can initiate the streaming of media content when the user presses the button 104 on one of the media devices 101. Furthermore, the control application 209A can be configured to run automatically in the background each time the connected electronic device 205 starts up, so that the control application 209A is available to communicate with the media devices 101 whenever the connected electronic device 205 is on. The control application 209A can further include features that can run in the foreground, such as an application displayed in the foreground allowing the user to modify which media content (e.g., switching from the first collection of audio content to the second collection of audio content described above) is to be provided when the user presses the button 104 on one of the media devices 101.

Having the control application 209A generally run in the background on the connected electronic device 205 allows the user to operate other applications and functions of the connected electronic device 205 without any interference from the control application 209A. Running the background will generally allow the control application 209A to be ready to receive and detect various application related inputs and/or perform some desired task without interfering with applications that are running in the foreground. For example, the control application 209A can initiate streaming of media content from the first content server 21 when the user presses the button 104 on one of the media devices 101 without the user directly interacting with the control application 209A.

The memory 207 of the electronic device 205 may be any technically feasible type of hardware unit configured to store data. For example, the memory 207 could include some form of non-volatile memory, such as a hard disk, a random access memory (RAM) module, a flash memory unit, or a combination of different hardware units configured to store data. The one or more software applications 209, which are stored within the memory 207, includes program code that may be executed by processor 206B in order to perform various functionalities associated with the connected electronic device 205.

The stored data 208 may include any type of information that relates to the configuration or control of the connected electronic device 205, user data, useful software applications, or other useful information. In some embodiments, the stored data 208 may include information relating to one or more software applications or tasks being performed by one or more of the software applications stored with the memory 207. The stored data 208 may reflect various data files, settings and/or parameters associated with communicating with the media device 101 or one or more of the servers 20-22 of the content distribution system 100.

Device and Software Setup Processes

Figure 2:
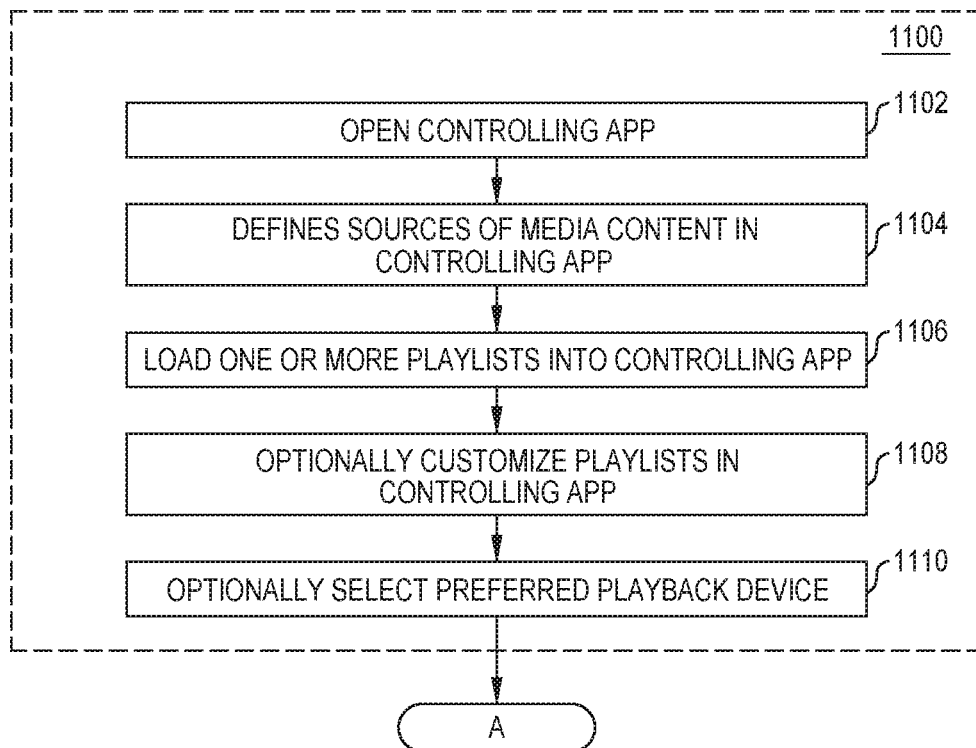
FIG. 2 shows a process flow diagram of a method of setting up a control application running on a connected electronic device, according to an embodiment.

FIG. 2 illustrates a process flow diagram of a method 1100 for performing a set up for the control application 209A running on the connected electronic device 205, according to one embodiment. The control application can be used to control how media content will be delivered to the media devices 101 when the button 104 is pressed on one of the media devices 101. For example, control application 209A can be used to control which media devices should play the received media content after the button 104 is pressed on one of the media devices 101. For example, the control application 209A can be configured so that one or both media devices 101 play the media content when the button 104 is pressed on one of the media devices 101. The control application 209A can further be used to control what media content will be delivered to the media devices 101 when the button 104 is pressed on one of the media devices 101. The media content can be specific to each individual media device 101A, 101B. For example, the first media device 101A could be located in a user's bedroom and the control application 209A could be configured to stream a playlist of classical music from the first content server 21 when the button 104 is pressed on the first media device 101A while the second media device 101B could be located in the user's living room and the control application could be configured to stream a playlist of rock music from the second content server 22 when the button 104 is pressed on the second media device 101B. In some embodiments, the control application 209A can initiate streaming of particular media content (e.g., a classical music playlist from the first content server) based on a device identifier, such as a device identifier included in the user input signal transmitted via the direct communication link D to the connected electronic device 205 from the first media device 101A when the button 104 is pressed on the first media device 101A. In other embodiments, instructions for playing a particular media content (e.g., a classical music playlist from the first content server) can be embedded in the signals (e.g., user input signals) transmitted to the connected electronic device 205 from the media device 101 when the button 104 is pressed on that media device 101. The method 1100 is described in reference to FIGS. 1 and 2.

At block 1102, the user opens the control application 209A on the connected electronic device 205 so that the user can interact with application in the foreground.

At block 1104, the user selects content providers (e.g., local content, Pandora®, Spotify®, Apple Music®, Deezer®) via a touch display on the connected electronic device 205 or other user input devices or methods. The control application 209A can then use the selected content providers as sources of media content when the button 104 is pressed on one of the media devices 101.

At block 1106, the user defines, or selects, the desired content (e.g., playlists, discrete songs, etc.) from the selected content providers that is to be streamed when the user presses button 104 on one of the media devices 101. The desired media content, such as audio content, can be selected via an interface provided by the code found within the control application 209A. In one embodiment, the control application 209A is able to access and/or receive the desired media content using a content provider software application 209B, 209C stored on the connected electronic device 205. As discussed above, the control application 209A can cause one or more uniform resource locators (URL), uniform resource identifiers (URI), or other types of information links to be generated by or received from the content provider so that it can be stored in memory of the connected electronic device 205 and used in subsequent steps. The uniform resource locators (URL), uniform resource identifiers (URI), or other types of information links are configured to allow access to the media content that is stored on the content server of the content provider.

At block 1108, the user arranges the selected desired media content (e.g., audio containing files) from block 1106 into different collections of desired content. For example, the user may arrange in the control application 209A a first collection of audio content that includes a first playlist of classical music from a first content provider and a second playlist of classical music from a second content provider. The user may also arrange in the control application 209A a second collection of audio content that includes a first playlist of rock music from the second content provider and a second playlist of rock music from a third content provider. The user may add as many collections of desired media content (e.g., audio content) to the control application 209A as desired. In some embodiments, the collections, and the information links associated therewith, may have a defined hierarchy (e.g., ordered list) such that they are retrievable by the control application 209A in a desired order based on the receipt of user input signals. Thus, after arranging the collections, the user can then select one of the collections set up in the control application 209A in order to cause that collection to be the first one streamed to one or more of the media devices 101 when the button 104 is pressed on one of the media devices 101. The collections that are not selected can be stored in the memory of the connected electronic device 205 so that the user can subsequently easily switch between the collections of media content that will be played when the user presses the button 104 on one of the media devices 101. In some cases, the collections can be stored in the memory of one of the servers (e.g., first server 20) so that the user can subsequently easily switch which collection of media content will be played when the user presses the button 104 on one of the media devices 101.

At block 1110, the user can select one or more media devices that will be used to play the media content of the collection selected at block 1108 when the button 104 is pressed on one of the media devices 101. Although FIG. 1 shows two media devices 101A and 101B, each with a button 104, some embodiments may include other media devices that do not include a button that can initiate the streaming of the media content. For example, a user can use the control application 209A to have the selected collection of media content played on the first media device 101A and another external speaker (not shown) when the button 104 is pressed on the media device 101A.

Figure 3:
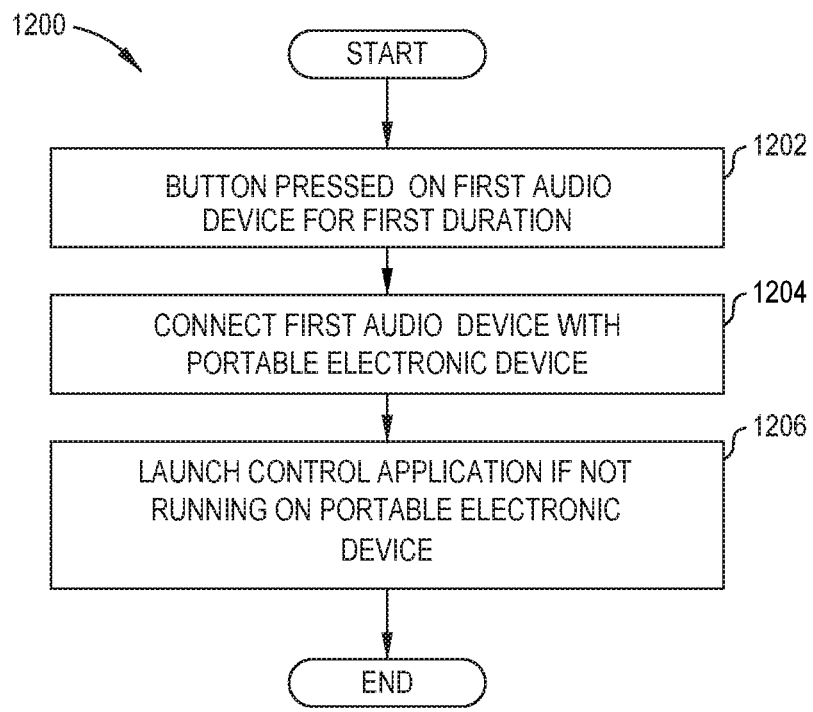
FIG. 3 shows a process flow diagram of a method of connecting the connected electronic device with an audio speaker, according to an embodiment.

FIG. 3 shows a process flow diagram of a method 1200 of connecting the connected electronic device 205 with the media device 101 on which the button 104 was pressed, according to one embodiment. The method 1200 can also be used to pair the media device 101 with the connected electronic device 205 the first time the devices establish communication with each other. Connected electronic device 205 is configured to connect with the media device 101 when the button 104 is pressed on the media device 101. The button 104 can be configured to initiate multiple functions when the button 104 is pressed. For example, the button 104 can be configured to power on the media device 101, cause the media device 101 to connect with the connected electronic device 205, as well as initiate the streaming of the media content selected, as described above in reference to FIG. 2, and start and stop the media content playing on the media device 101. The method 1200 is described in reference to FIGS. 1 and 2. The method 1200 is further described in reference to the first media device 101A, but the method 1200 can operate in a similar fashion to when the button 104 is pressed on the second media device 101B.

At block 1202, the user presses the button 104 on the first media device 101A for a first time duration, such as between about 2 seconds and about 10 seconds, such as between about 3 seconds and about 5 seconds. When the button 104 is pressed for the first time duration, the first media device 101A is configured to be able to enter a connecting mode, in which the media device 101 initiates and tries to connect with connected electronic device 205 via the direct communication link D. In some embodiments, the process of connecting the media device 101 and the connected electronic device 205 starts with the media device 101 and the connected electronic device 205 initiating communication with each other via the communication link D. The communication link D may be performed via a wired or wireless communication technique (e.g., Bluetooth classic, BTLE, IrDA, Wireless USB, or ZigBee). In one example, block 1202 may include the initial pairing process commonly performed by wireless connected electronic devices to allow them to securely communicate with each other.

Pressing the button 104 for the first time duration can also power the first media device 101A "on" if the first media device 101A is not already powered on. In some embodiments, pressing the button 104 for less than the first time duration can be used to send standardized Bluetooth® AVRCP signals, such as start (play), stop, and skip. However, the pressing and holding the button for a desired duration is not required to cause the subsequent actions described below, and thus may be used an optional distinguishing feature of the user input provided to the first media device 101A at block 1202.

In some embodiments, when the speaker is powered on with the button 104, a sound is emitted to let the user know that the speaker is working to establish a connection with a connected electronic device 205. In some configurations, if a user powers the first media device 101A on with a different button than button 104 (e.g., separate power button), a first sound (e.g., drum type sound) is emitted by the media device 101A, thus signifying the power is on. However, if the user powers the audio device on using the button 104, a sound is emitted (e.g., drum sound) and then a second sound (e.g., "busy" or "heartbeat" sound) is emitted until media content is played by the first media device 101A or an error message is played by the first media device 101A.

Having the first media device 101A power on and/or enter a connecting mode when the button 104 is pressed for the first time duration can be useful to simplify the user input requirements to initiate these tasks, and can be additionally useful when the button 104 is also used to provide other user input, such as stopping or starting the playing of media content. In some embodiments, the act of pressing the button 104 or pressing the button 104 in a desired sequence can be used to cause the software application on first media device 101A to perform one or more desirable process steps, such as enter paring mode, send standard AVRCP signals. In other embodiments, in which a button with more limited functionality is used, this button can be pressed without the need for an extended duration, and the first media device 101A can power on or enter a connecting mode when the button is pressed.

At block 1204, the first media device 101A connects (i.e., forms a communication link) with the connected electronic device 205 if the first media device 101A was not already connected with the connected electronic device 205.

Next, at block 1206, the control application 209A is launched if the control application 209A is not already running on the connected electronic device 205. As discussed above, in some embodiments, the launched control application 209A is then used to control what media content and how the media content is to be provided to the media devices 101.

Initiating Streaming Utilizing the Audio Device Example

Figure 4:
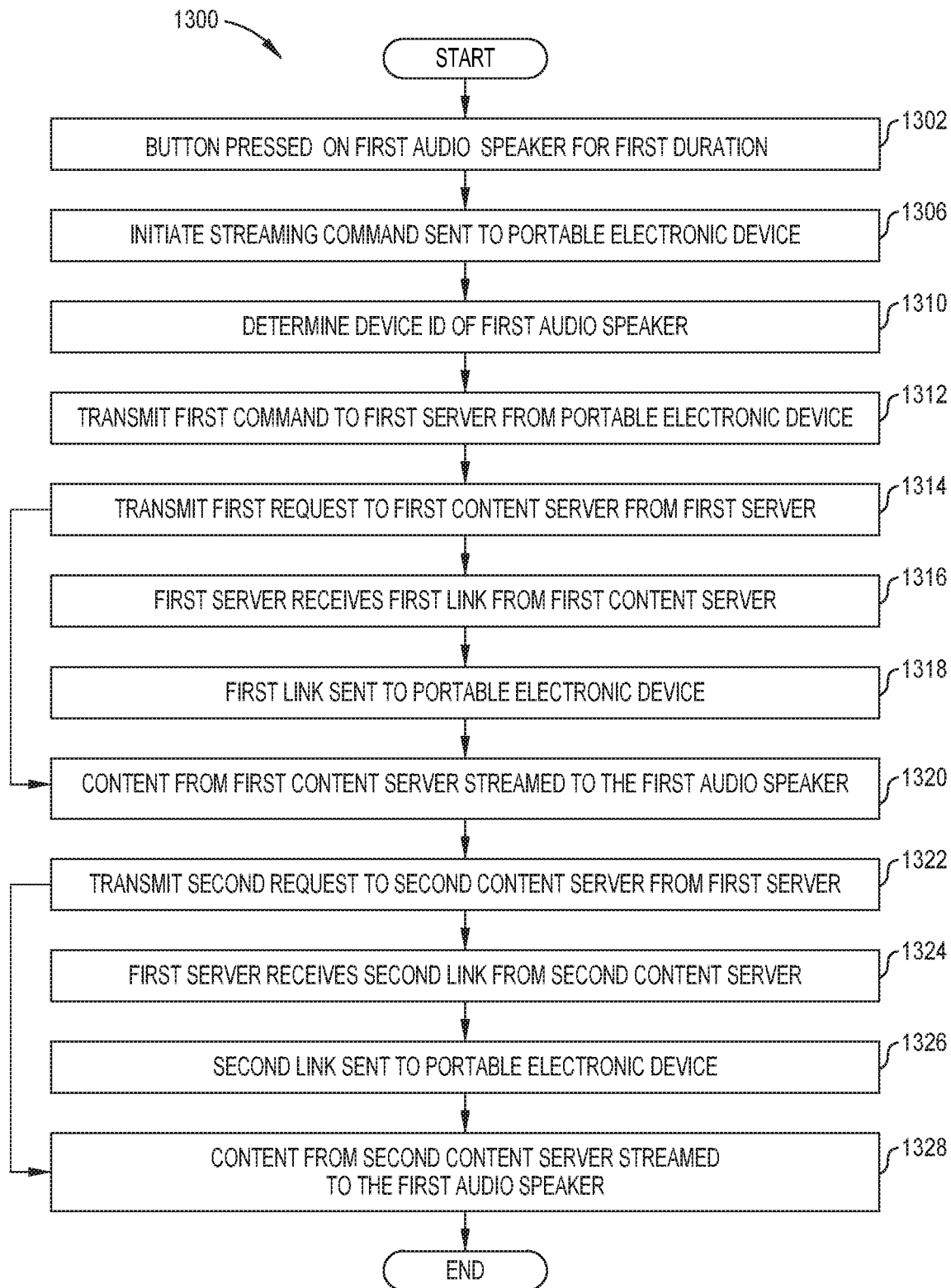
FIG. 4 shows a process flow diagram of a method of initiating streaming of the media content selected in the control application to the media device, according to an embodiment.

FIG. 4 illustrates a process flow diagram of a method 1300 of initiating streaming of the media content to the media device 101A (i.e., the media device 101 on which the button 104 was pressed) using the control application 209A, according to one embodiment. The method 1300 is described in reference to FIGS. 1-3.

The method 1300 is also further described in reference to the first media device 101A, but the method 1300 may also operate in a similar fashion if the button was pressed on the second media device 101B.

At block 1302, the user presses and holds the button 104 on the first media device 101A for a first time duration, such as a time between about 3 seconds and about 5 seconds. In some embodiments, the first time duration at block 1302 is the same as the first time duration of block 1202 described above in reference to FIG. 3, which initiated the connection between the first media device 101A and the connected electronic device 205. Thus, pressing the button 104 for the first time duration can be used to signify that the first media device 101A is to power "on" and initiate the connection between the first media device 101A and the connected electronic device 205.

As discussed further below, in some embodiments of method 1300, the process step(s) in block 1418 and either process step(s) in block 1420 or 1422, are performed by the first media device 101A before proceeding from block 1302 to block 1306.

At block 1306, once communication is established between the first media device 101A and the connected electronic device 205 (see FIG. 3) and proper communication with the control application 209A is achieved, a user input signal is transmitted from the first media device 101A to the connected electronic device 205. In the transmitted user input signal, streaming command information, which includes initiate playlist streaming command (e.g., also referred to as a "Magic Button Command") is transmitted from the first media device 101A to the connected electronic device 205. The initiate playlist streaming command can be used to initiate streaming of the media content, optionally arranged into a plurality of playlists and/or discrete songs or other media content, selected by the user in control application 209A to stream when the button 104 is pressed.

In cases where the user pressed the button 104 on the first media device 101A for a time duration less than the first time duration during block 1302, the first media device 101A will transmit a different set of signals from the first media device 101A to the connected electronic device 205. In one embodiment, the different set of signals can include standard commands, such as AVRCP signals (e.g., start, play and stop signals).

In some embodiments, the initiate streaming command can be transmitted from the first media device 101A to the connected electronic device 205 using a different communication protocol than the communication protocol used by the first media device 101A and/or the connected electronic device 205 for the delivery of standard commands, such as AVRCP signals (e.g., start and stop signals). The use of different communication protocols will reduce the chance that the different signals (i.e., streaming command signal and standard command signal) will interfere with each other.

Transmitting song start/stop/skip commands using standardized AVRCP commands (i.e., second type of communication protocol) while sending the initiate playlist streaming command using a non-standard command protocol (i.e., a first type of communication protocol) can enable a first electronic device to send an initiate playlist streaming command to a connected electronic device that is already streaming audio to a second electronic device. The second electronic device could be an audio device, for example, and provide for standardized AVRCP commands to be sent by the second electronic device to the connected electronic device for start/stop/pause/skip commands for audio playback. The first electronic device could be a smartphone, a speaker, a smart switch, a remote control, or any number of devices that may or may not include standardized AVRCP command functionality.

At block 1310, when the control application 209A is running on the connected electronic device 205, then the control application 209A may be used to enable the connected electronic device 205 to determine a device ID of the first media device 101A. The device ID of the first media device 101A can be used by the control application 209A to ensure that the desired media content is streamed to the correct audio device (i.e., the first media device 101A) when the streaming of the media content begins. The process of determining that the first media device 101A is the desired device to stream the media content to is determined by comparing information contained in the device ID and device information stored in the non-volatile memory.

At block 1312, the connected electronic device 205 uses the control application 209A to transmit a delivery command to the first server 20 to play the media content that is selected for the first media device 101A in the control application 209A. For example, the media content that is selected to be streamed to the first media device 101A could be a first collection of media content that includes a first playlist of classical music from a first content provider and a second playlist of classical music from a second content provider. The media content can include a plurality of playlists that were defined using the steps provided in the method 1100 discussed above. Each of the plurality of playlists may include a selection of songs from a respective content provider or songs from a plurality of content providers.

At block 1314, the first server 20 transmits a first request to the first content server 21 via the interconnecting communication link 21B based on the delivery command received at the first server 20 at block 1312 and based on the first server 20 determining that the first content server 21 is associated with a first content provider. The first request will include information provided in or derived from a delivery command sent from the connected electronic device 205 that will in subsequent steps cause the selected content (e.g., content identified in method 1100) to be streamed from the content server 21. In some embodiments, the first request can include a request for an information link that can be used to start streaming the first playlist, which is a playlist of classical music stored in the user's account for the first content provider.

In some embodiments, after the first request is received by the first content server 21 during block 1314, the first content server 21 will then stream the content selected (e.g., content identified in method 1100) from the information contained in the first request to the first media device 101A directly, using the communication link 125, or indirectly via, for example, the connected electronic device 205 using the communication link 21A and the direct communication link "D". Having the streaming go through the first server 20 or the connected electronic device 205, versus directly to the first media device 101A, can enable the first server 20 or the connected electronic device 205 to monitor when the streaming of the first playlist from the first content provider is approaching the end of the first playlist, so that the first server 20 or the connected electronic device 205 can send a request to initiate streaming of the next media content that is in the user's first collection of media content, such as a second playlist of classical music from a second content provider.

Optionally, at block 1316, the first content server 21 can send a first information link (e.g., a URL or URI) to the first server 20 or connected electronic device 205 rather than automatically start streaming the selected content identified in delivery command information. In this block, the first server 20 or connected electronic device 205 will receive a first information link (e.g., a URL or URI) from the first content server 21. The first information link can be used to get access to stream media content associated with the first request provided to the first content server 21 at block 1314. For example, the first information link could be a link to initiate streaming of the user's playlist of classical music that is associated with the user's account with the first content provider.

Optionally, at block 1318, the first server 20 transmits the first information link received from the first content server 21 to the first media device 101A via a hub communication link (not shown) or to the connected electronic device 205 via the communication link 20A.

At block 1320, the media content from the first content server 21 (e.g., first playlist of classical music) is streamed to the first media device 101A. In some embodiments, the media content from the first content server 21 is streamed to the first media device 101A through the connected electronic device 205 and the first server 20. As similarly discussed above, having the streaming content go through the first server 20 and/or the connected electronic device 205, versus directly to the first media device 101A, can be useful. The first content server 21 can have one or more content provider software applications running thereon that are used to identify and stream the desired media content based on the receipt of the first request that is derived on the generated delivery command.

Alternately, at block 1320, if blocks 1316 and 1318 are performed, the media content from the first content server 21 (e.g., first playlist of classical music) is streamed to the first media device 101A using the one or more communication links. In some embodiments, the media content from the first content server 21 is streamed to the first media device 101A through the connected electronic device 205 and the first server 20. In one embodiment, the first server 20 or the connected electronic device 205 can use the first information link to initiate streaming of the media content from the first content provider on the first content server 21. The first server 20 or the connected electronic device 205 which initiates the streaming of the media content from the first content provider on the first content server 21 can then receive and then transmit the streamed media content from the first content provider to the first media device 101. As similarly discussed above, having the streaming content go through the first server 20 and/or the connected electronic device 205, versus directly to the first media device 101A, can be useful.

In an alternate embodiment of block 1320, after receiving the first information link from the first server 20 in block 1318, the first media device 101A directly communicates with the first content server 21 so that it can stream the first playlist directly from the first content server 21 via the communication link 25, shown in FIG. 1.

In alternate embodiments of blocks 1316, 1318 and 1320, the first information link is transmitted directly to the first media device 101A from the first content server 21, so that the first media device 101A can then directly stream the first playlist from the first content server 21 using the communication link 25, shown in FIG. 1.

At block 1322, the first server 20 can transmit a second request to the second content server 22 based on (1) the delivery command received at the first server at block 1312, (2) determining that the streaming of the first playlist from the first content server 21 is approaching the end of the first playlist, and (3) based on the first server 20 determining that the second content server 22 is associated with the second content provider. The second request can include additional delivery command information, or a request for an information link, that can be used to start streaming the second playlist, which, for example, is a playlist of classical music stored in the user's account for the second content provider.

In some embodiments, after the second request is received by the second content server 22 during block 1322, the second content server 22 will then stream the content selected (e.g., second content identified in method 1100) from the information contained in the second request to the first media device 101A directly, using the communication link 125, or indirectly via, for example, the connected electronic device 205 using the communication link 22A and the direct communication link "D".

Optionally, at block 1324, the first server 20 receives a second information link (e.g., a URL or URI) from the second content server 22 that can be accessed to stream media content associated with the request provided to the second content server 22 at block 1322. For example, the second information link could be provided to initiate streaming of the user's playlist of classical music that is associated with the user's account for the second content provider.

Optionally, at block 1326, the first server 20 transmits the second information link received from the second content server 22 to the first media device 101A or the connected electronic device 205. In one embodiment, the first server 20 or the connected electronic device 205 can use the second information link to initiate streaming of the media content from the second content provider, and the first server 20 or the connected electronic device 205 which initiates the streaming of the media content from the second content provider can then receive and then transmit the media content from the second content provider to the first media device 101. Having the streaming go through the first server 20 or the connected electronic device 205 can enable the first server 20 or the connected electronic device 205 to monitor when the streaming of the second playlist from the second content provider is approaching the end of the second playlist, so that the first server 20 or the connected electronic device 205 can send a request to initiate streaming of the next media content that is in the user's first collection of media content, such as a third playlist of classical music from a third content provider.

At block 1328, the media content from the second content server 22 (e.g., second playlist of classical music) is streamed to the first media device 101A using the one or more communication links. In some embodiments, the media content from the second content server 22 is streamed to the first media device 101A through the connected electronic device 205 and the first server 20. As similarly discussed above, having the streaming content go through the first server 20 and/or the connected electronic device 205, versus directly to the first media device 101A, can be useful.

Alternately, at block 1328, if blocks 1324 and 1326 are performed, the first server 20 or the connected electronic device 205 use the second information link generated and transmitted during blocks 1324 and 1326 to initiate streaming of the media content from the first content provider on the second content server 22. The first server 20 or the connected electronic device 205 which initiates the streaming of the media content from the second content provider on the second content server 22 can then receive and then transmit the streamed media content from the second content provider to the first media device 101A.

In an alternate embodiment of block 1326, after receiving the second information link from the first server 20 in block 1324, the first media device 101A directly communicates with the second content server 22 so that it can stream the first playlist directly from the second content server 22 via a communication link (not shown for clarity of illustration), which is similar to the type of communication link that can be used to separately connect the first content server 21 to the first media device 101A (i.e., communication link 25 shown in FIG. 1).

In alternate embodiments of blocks 1322, 1324 and 1326, the second information link is transmitted directly to the first media device 101A from the second content server 22, so that the first media device 101A can then directly stream the first playlist from the second content server 22 using a formed communication link.

Device Process and Configuration Flows

Figure 5A:
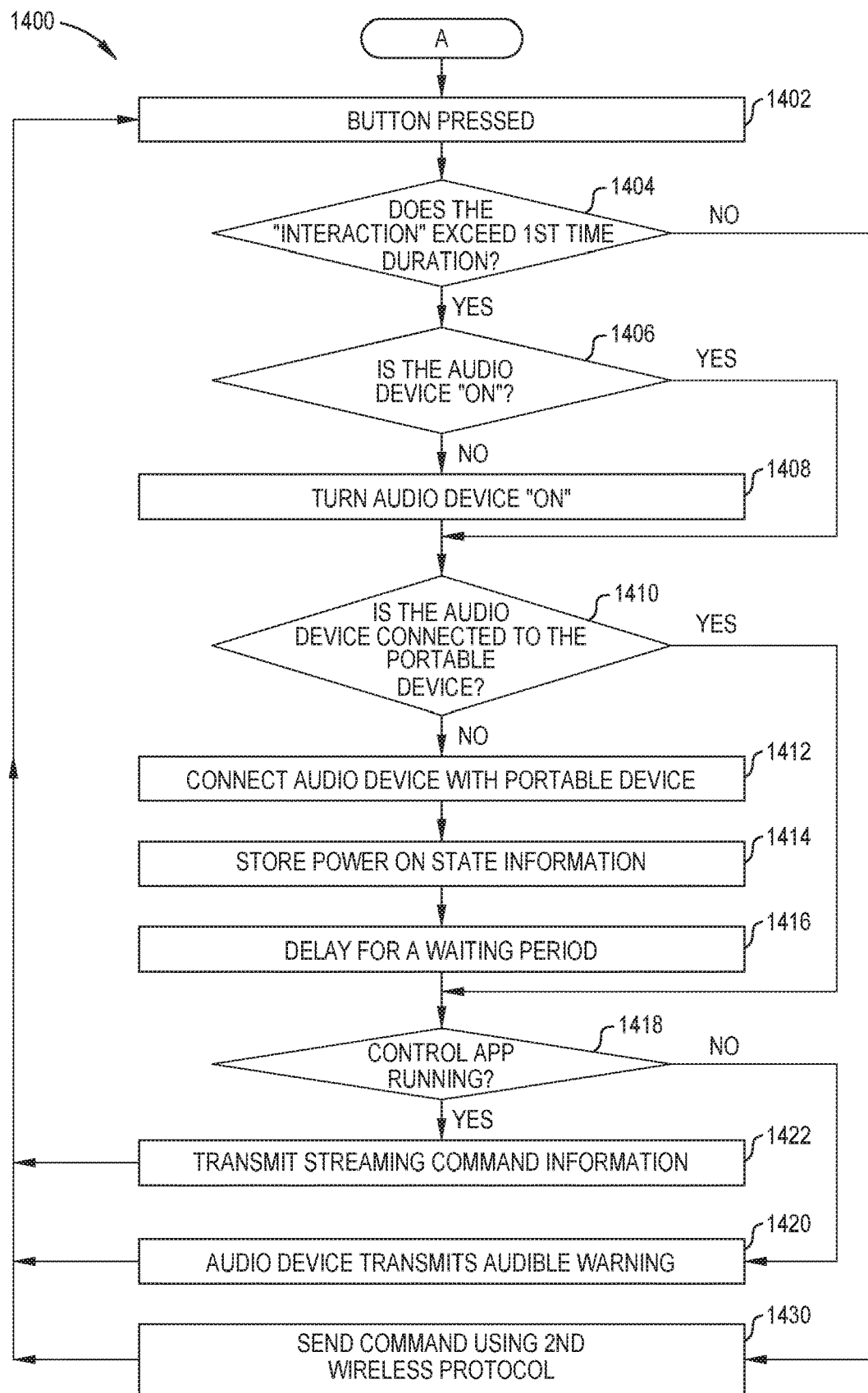
FIGS. 5A-5D illustrate process flow diagrams of methods of initiating streaming of media content, according to an embodiment.

FIG. 5A illustrates various process steps that may be performed by the processors and software applications running on at least one of the media devices 101 that is used to initiate the process of streaming information based on a user's interaction with at least one of the media devices 101. More specifically, FIG. 5A illustrates the steps performed by an media device 101 when a user input is received at an media device 101, such as the user presses the button 104 on the media device 101A.

FIG. 5A illustrates a process flow diagram of a method 1400 of initiating streaming of the media content from an media device 101, such as media device 101A, according to one embodiment. The method 1400 is described in reference to the first media device 101A. However, the method 1400 may also operate in a similar fashion if the button was pressed on another media device 101, such as the second media device 101B.

At block 1402, the user presses the button 104 on the first media device 101A for a first time duration. In some embodiments, the first time duration at block 1402 is the same as the first time duration of block 1202 described above in reference to FIG. 3. During block 1402, pressing the button 104 for the first time duration can power on and initiate the connection between the first media device 101A and the connected electronic device 205.

At block 1404, the processors and software applications running on the media devices 101A analyze the signal generated by the button 104 to determine if the user's interaction with the button 104 exceeded a time threshold value that is stored within the memory of the media device 101A. In one example, the time threshold value is equivalent to a time between about 2 seconds and about 10 seconds, such as, for example, a time greater than 2 seconds, a time greater than 3 seconds or a time greater than 5 seconds. Thus, in one example, if the user's interaction exceeded the 3 seconds, the software running on the audio device would set a software flag and/or store this information in memory so that it can be used in one or more of the blocks described below. If the user's interaction did not exceed the time threshold value the process sequence then jumps to block 1430, which is discussed further below.

If the user's interaction with the button 104 exceeded a time threshold value, the process sequence then continues on to block 1406. At block 1406, the processors and software applications running on the media device 101A analyze whether the media device 101A was already powered "on". If the media device 101A was already powered "on," the process sequence then jumps to block 1410, which is discussed further below.

If the media device 101A was not powered "on," the process sequence continues on to block 1408, at which time the media device 101A is caused to move to a powered "on" state. In some embodiments, the software running on the media device 101A sets a software flag and/or stores information about the prior non-powered "on" state of the media device 101A prior to the user's interaction with the button 104, so that this information can be used in one or more of the blocks described below.

At block 1410, the processors and software applications running on the media devices 101A analyze whether the media device 101A is connected to the connected electronic device 205 (e.g., paired with the connected electronic device 205 as discussed above in block 1202). If the media device 101A is in communication with the connected electronic device 205 the process sequence then jumps to block 1418, which is discussed further below.

If the media device 101A was not connected to or in communication with the connected electronic device 205, the process sequence continues on to block 1412. At block 1412, the media device 101A enters into a connecting mode, in which the media device 101A initiates and tries to connect with connected electronic device 205 via the direct communication link D, as discussed above in block 1202.

Next, at block 1414, the processor and software application(s) running on the media device 101A then store time related information regarding when the user's interaction with the button 104 occurred and/or it was determined that the user's interaction with the button 104 exceeded the time threshold value. In some embodiments, rather than storing time related information in memory, a timer, which is initiated at the instant in time, or soon thereafter, the user's interaction with the button 104 has occurred and/or is initiated after it is determined that the user's interaction with the button 104 exceeded the time threshold value, is started. The stored information or initiated timer can then be used by one or more of the process sequence steps discussed herein.

Next, at block 1416, the processors and software applications running on the media devices 101A then wait a desired period of time before proceeding on to block 1418. The process of waiting a desired period of time can be useful to make sure that the media device 101A and the connected electronic device 205 have time to connect (e.g., pair) with each other before moving on to block 1418. In one example, the period of time, or hereafter wait time, can be on the order of milliseconds, on the order seconds, or even on the order of tens of seconds.

At block 1418, the media device 101A determines if the control application 209A is running on the connected electronic device 205. The first audio device may determine that the control application 209A is running by sending a notification request, via the direct communication link D, to the connected electronic device 205, which then notifies the first media device 101A that the control application is running or not running.

At block 1420, if it is determined by the media device 101A that the control application 209A is not running in the foreground or background of the connected electronic device 205, the first media device 101A generates a warning that is provided to the user (e.g., an audible or visible warning).

If it is determined by the media device 101A that the control application 209A is running in the foreground or background of the connected electronic device 205, at block 1422, the first media device 101A sends a user input signal to the connected electronic device 205. The user input signal can include streaming command information, which includes an initiate streaming command if it was determined, during block 1404, that the user's interaction with the button 104 exceeded a time threshold value that is stored within the memory of the media device 101A. As discussed above in conjunction with FIG. 4, in some embodiments, the initiate streaming command can be transmitted from the first media device 101A to the connected electronic device 205 using a first communication protocol. The first communication protocol can include, but are not limited to Bluetooth classic, BTLE, IrDA, Wireless USB, or ZigBee. Having the initiate streaming command, or some of the other streaming command information, utilize a first communication protocol will have an advantage of reducing the chance of the generated signal interfering with the standard functioning of devices that use other standard protocols (e.g., AVRCP) to perform common tasks, such as device control and playback functions.

Referring back to FIG. 5A, if it is determined during block 1404 that the user's interaction did not exceed the time threshold value the process sequence then performs block 1430. At block 1430, the media device 101A sends a device control signal to the connected electronic device 205. The device control signal will include the various device control commands using a second communication protocol, as similarly discussed above in relation to block 1306. In one example, the second communication protocol can include standardized AVRCP commands, such as start/stop/pause/skip commands for audio playback.

Initiating Streaming Utilizing the Connected Electronic Device Example

Figure 5B:
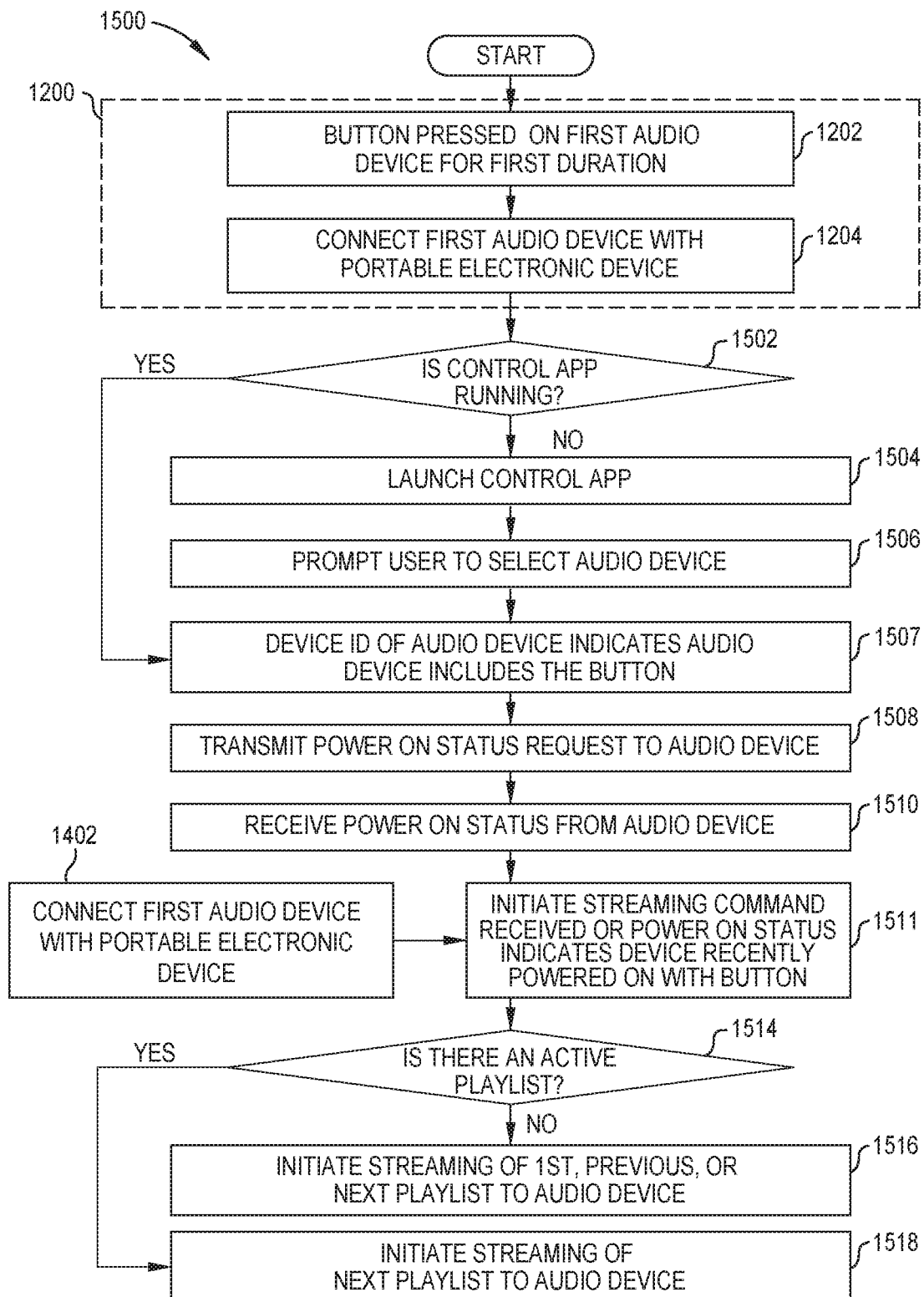

FIG. 5B illustrates a process flow diagram of a method 1500 of initiating streaming of the media content, which is selected in the control application 209A, to the audio speaker, according to one embodiment. The method 1500 begins with the first two blocks 1202 and 1204 from the method 1200 described above in reference to FIG. 3, and are summarized here. At block 1202, the button 104 is pressed on the first media device 101A for a first time duration. At block 1204, the first media device 101 is connected with the connected electronic device 205 via a communication link D.

The remainder of the method 1500 is described from the perspective of the connected electronic device 205 to provide additional detail on how the control application 209A in the connected electronic device 205 can initiate the streaming of the media content selected in the control application 209A to be streamed to the first media device 101A.

At block 1502, after establishing communication with the first media device 101A, connected electronic device 205 checks if the control application 209A is running in the foreground or background of the connected electronic device 205.

At block 1504, if the control application 209A is not running, then the connected electronic device 205 can launch control application 209A. The operating system (e.g., Apple iOS® or Android®) of connected electronic device 205 may enable control application 209A to be launched in response to a Bluetooth® or other connection being established with a corresponding hardware device, such as first media device 101A. In some cases, the connected electronic device 205 can launch control application 209A based on a signal sent from the first media device 101A during block 1502.

At block 1506, the connected electronic device 205 can optionally prompt the user to select the first media device 101A, for example by displaying a pop-up window showing the available media devices, to ensure that the streaming of the media content will be streamed to the correct audio device.

At block 1507, which can be reached after block 1506 or directly from block 1502 if the control application 209A was determined to be running at block 1502, the connected electronic device 205 can check a device ID of the first media device 101A to determine that the first media device 101A is a device that includes a single input receiving device, such as the button 104, that can be used to initiate transmit a playlist streaming command as disclosed herein.

At block 1508, the connected electronic device 205 transmits a power on status request to the first media device 101A based on determining at block 1507 that the connected device (i.e., first media device 101A) is capable of transmitting an initiate playlist streaming command. The power on status request is used to identify whether the first media device 101A was recently powered on by the button 104, for example within a given first time period, such as within the last minute or five minutes. The power "on" status information received from the media device 101A can be the information stored in memory during block 1414 of FIG. 5A, which is discussed below. The power on status can be used by the connected electronic device 205 to determine whether media content of the selected media content in the control application 209A should be streamed to the first media device 101A as described in further detail below. The power on status can indicate whether first media device 101A was powered on by button 104 or a separate power button, for example. If first media device 101A is powered on via button 104, then control application 209A may initiate playlist streaming as disclosed herein. If first media device 101A is powered on by a separate power button, then control application 209A may be configured to not initiate playlist streaming. For example, if the first media device 101A is powered on by a separate button, then the first media device 101A may start streaming media content that the connected electronic device is already streaming, for example to another audio device, such as the second media device 101B.

Although first media device 101A may send an initiate playlist streaming command after it is powered on via button 104, the initiate playlist streaming command may be lost in transit due to a wireless connection not being established or stable yet, timed out, and/or delayed due to power up and initialization functions of first media device 101A. To obviate the condition that the initiate playlist streaming command may not be received by control application 209A or received within a sufficient time, control application 209A may request the power on status of first media device 101A in response to detecting a connection to first media device 101A (or similar audio devices with initiate playlist streaming functionality).

Figure 5C:
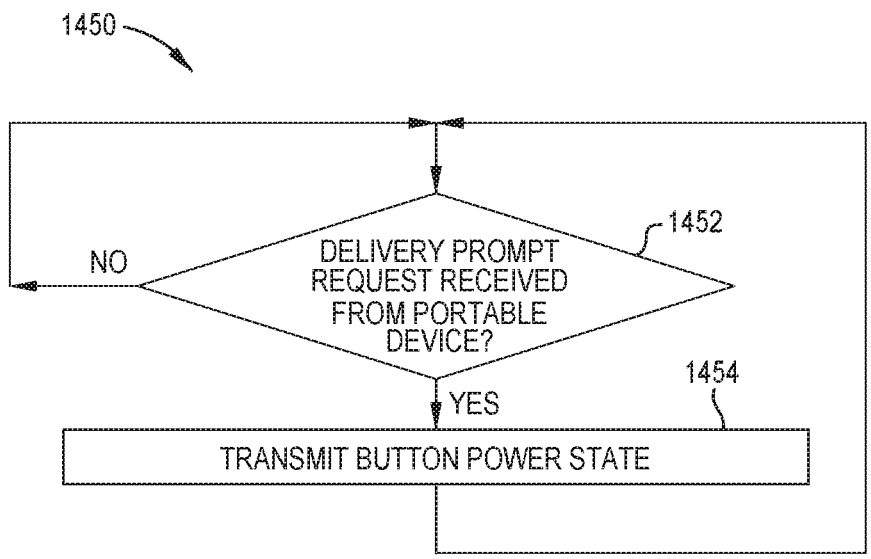

The method 1450, which is illustrated in FIG. 5C, are directed to a routine that enables an media device 101A to respond to a request for the power on status, or delivery prompt request, received from the connected electronic device 205. At block 1452, the upon receiving a communication from the connected electronic device 205, the processors and software applications running on the media devices 101A determine whether a delivery prompt request has been received. Next, at block 1454, if delivery prompt request has been received the media device 101 then responds to the connected electronic device 205 with information relating to its power "on" state (e.g., time information stored during block 1414) and, optionally, how the audio device was powered "on" (e.g., using button 104 or a separate power button). The media device 101A can be configured to store information concerning how recently the media device 101A was powered on and how the audio device was powered "on", and transmit this information to the connected electronic device 205.

Referring back to FIG. 5B, at block 1510, the connected electronic device 205 receives the power on status from the first media device 101A.

At block 1511, connected electronic device 205 determines whether (1) an initiate playlist streaming command was received by the connected electronic device 205 or (2) the first media device 101A was recently powered on by the button 104 based on the power on status information received at block 1510. Either of these conditions indicate that the button 104 was recently pressed, for example for the first time duration (see block 1202) discussed above. The information provided in block 1510 can be used by the connected electronic device 205 to know whether to initiate streaming of the media content desired by the user. In some cases, if the media device 101A has been powered "on" for an extended period of time, the control application can infer that the media device 101A was powered "on" and an initiate streaming command was transmitted from the first media device 101A.

Optionally, at block 1402 shown in FIG. 5B, the first media device 101A can separately connect to the connected electronic device 205 without pressing the button 104 to power on the first media device 101A. After making this connection with the first media device 101A that is already powered on, the button 104 can be pressed by the user to give the initiate playlist streaming command, which is then received at block 1511.

At block 1514, after determining that the first media device 101A was recently powered on by the button 104 or an initiate playlist streaming command was given by the button 104, the connected electronic device 205 determines whether there is an active playlist of media content selected in the control application 209A currently playing on the connected electronic device 205 or being streamed to another audio device. An active playlist can be selected in the control application 209A during the steps described during method 1100.

At block 1516, if it is determined that there is no active playlist at block 1514, then the connected electronic device 205 can initiate streaming of the first playlist of the selected media content, a previous playlist of the selected media content (i.e., the most recent playlist stream to the first media device 101) to the first media device 101A, or toggle to the next playlist of the selected media content. The connected electronic device 205 can initiate the streaming as described in method 1300 discussed above in reference to FIG. 4.

At block 1518, if it is determined that there is an active playlist streaming to the first media device 101A, then the connected electronic device 205 can initiate streaming of the next playlist (i.e., toggle to the next playlist) of the selected media content to the first media device 101A.

In some cases, the connected electronic device 205 can receive initiate playlist streaming commands sequentially from two or more devices. For example, a first device (e.g., first media device 101A) can transmit an initiate playlist streaming command to the connected electronic device 205, and the connected electronic device 205 may initiate streaming of a first playlist (e.g., block 1516 or 1518). Then a second electronic device (e.g., second media device 101B) may send a second initiate playlist streaming command causing the connected electronic device 205 to initiate streaming of the next playlist. Thus, multiple electronic devices (e.g., media devices 101) can be controlled by a single connected electronic device 205 using the initiate playlist streaming commands, and the single connected electronic device 205 may cycle through playlists agnostically due to commands separately received from the electronic devices (e.g., media devices 101).

Figure 5D:
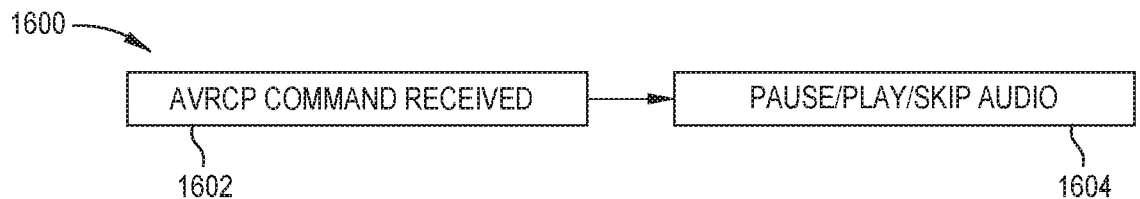

Similarly, connected electronic device 205 may receive and responds to AVRCP or other commands from other devices (i.e., devices not including the button 104) concurrently with the initiate playlist streaming commands as disclosed herein. For example, the method 1600 in FIG. 5D shows that the connected electronic device 205 can independently receive AVRCP commands in block 1602 and respond to those commands at block 1604, for example by pausing or playing media content or skipping to additional media content, such as the next song in a playlist.

While the foregoing is directed to embodiments of the present disclosure, other and further embodiments of the disclosure may be devised without departing from the basic scope thereof, and the scope thereof is determined by the claims that follow.

What is claimed is:

1. A method of streaming media content, comprising:
   transmitting a first user input signal from a first content player, wherein
   the first user input signal comprises streaming command information,
   the first user input signal was generated from a first signal generated by an electromechanical device of the first content player based on a user's interaction with the electromechanical device, and
   the first user input signal consists of information other than information configured to identify a media-containing file;
   transmitting a first delivery command from a connected electronic device to a first content server after a control software application running on the connected electronic device determines that the first user input signal comprises streaming command information, wherein
   the transmission of the first delivery command is provided automatically based on receipt of the first user input signal, and
   the first delivery command comprises media identification information relating to a first playlist of a plurality of playlists; and
   streaming information comprising at least one media-containing file that is provided from the first content server to the first content player based on information contained within the first delivery command, wherein the at least one media-containing file includes content from the first playlist.

2. The method of claim 1, wherein streaming the information from the first content server to the first content player further comprises:
   transmitting the stream of information from the first content server to the connected electronic device; and then transmitting the stream of information from the connected electronic device to the first content player.

3. The method of claim 1, wherein the first user input signal is only provided when attributes of the interaction of the user with the electromechanical device comprises interacting with the electromechanical device for at least a first time duration.

4. The method of claim 1, wherein transmitting the first delivery command to the first content server further comprises:
   retrieving information regarding a first content provider from memory of the connected electronic device based on a receipt of the first user input signal,
   wherein the retrieved information comprises information relating to the at least one media-containing file that is accessible from the first content server.

5. The method of claim 4, wherein the first delivery command comprises information that a first content provider's software application running on the first content server uses to identify the at least one media-containing file.

6. The method of claim 1, wherein
   due to attributes of the interaction of the user with the electromechanical device the first content player generates either the first user input signal or a second signal, and
   the second signal comprises one or more standard device control commands.

7. The method of claim 1, further comprising:
   transmitting a second user input signal from the first content player, wherein the second user input signal comprises additional streaming command information, and the second user input signal was generated from a second signal generated by the electromechanical device on the first content player based on the user's second interaction with the electromechanical device;
   transmitting a second delivery command from the connected electronic device to a second content server after the control software application determines that the second user input signal comprises the additional streaming command information, wherein
   the transmission of the second delivery command is provided based on receipt of the second user input signal, and
   the second delivery command comprises additional media identification information relating to a second playlist of the plurality of playlists; and
   streaming information comprising at least one additional media-containing file that is provided from the second content server to the first content player based on information contained within the second delivery command, wherein the at least one additional media-containing file includes content from the second playlist.

8. The method of claim 7, wherein transmitting the second delivery command to the second content server further comprises:
   retrieving information regarding a second content provider from memory of the connected electronic device based on a receipt of the second user input signal,
   wherein the retrieved information comprises information relating to the at least one additional media-containing file that is accessible from the second content server.

9. The method of claim 8, wherein the second delivery command comprises information that a second content provider's software application running on the second content server uses to identify the at least one additional media-containing file.

10. The method of claim 1, wherein the control software application is configured to allow a user to:
    generate a first collection of to two or more audio-containing files; or
    modify the first collection to two or more audio-containing files that are stored within the first content server.

11. The method of claim 1, wherein the first content player comprises a wireless speaker, and the electromechanical device comprises a button.

12. A method of streaming media content, comprising:
    defining a first collection of media content, wherein the first collection comprises a plurality of media-containing files that are accessible from a first content provider;
    storing a first information link associated with the defined first collection of media content in memory of a connected electronic device;
    receiving a first user input signal at the connected electronic device from a first content player, wherein the first user input signal comprises streaming command information, the first user input signal was generated from a first input provided to the first content player by a user, and the first user input signal consists of information other than information configured to identify a media-containing file;

transmitting a first delivery command from the connected electronic device to a first content server after a control software application running on the connected electronic device determines that the first user input signal comprises the streaming command information, wherein the transmission of the first delivery command is provided based on receipt of the first user input signal, and the first delivery command comprises the first information link; and streaming information comprising at least one media-containing file that is provided from the first content server to the first content player based on information contained within the first delivery command, wherein the at least one media-containing file includes content from the first collection.

13. The method of claim 12, wherein streaming the information from the first content server to the first content player further comprises:

transmitting the stream of information from the first content server to the connected electronic device; and then transmitting the stream of information from the connected electronic device to the first content player.

14. The method of claim 12, wherein the first information link provided in the first delivery command comprises information that a first content provider's software application running on the first content server uses to identify the at least one media-containing file.

15. The method of claim 12, wherein the first user input signal is only provided when the user interacts with an electromechanical device associated with the first content player for at least a first time duration, and due to attributes of the interaction of the user with the electromechanical device the first content player generates either the first user input signal or a second signal, and the second signal comprises one or more standard device control commands.

16. The method of claim 12, further comprising:

storing a second information link associated with the defined first collection of media content in memory of the connected electronic device;

transmitting a second delivery command from the connected electronic device to a second content server based on the control software application determining that the streaming of the at least one media file from the first content server is approaching an end, wherein the transmission of the second delivery command is provided based on receipt of the first user input signal, and the second delivery command comprises the second information link; and streaming information comprising at least one additional media-containing file that is provided from the second content server to the first content player based on information contained within the second delivery command, wherein the at least one additional media-containing file includes content from the first collection.

17. The method of claim 16, wherein the second information link is positioned in an ordered list within the memory behind the first information link so that the transmission of the first delivery command occurs in time before the transmission of the second delivery command.

18. The method of claim 12, wherein the first content player comprises a wireless speaker that comprises a first button, the first user input signal is only provided when the user interacts with the first button associated with the first content player, and the wireless speaker further comprises a second button that is configured to cause the generation of a second signal, by the wireless speaker, that comprises one or more standard device control commands when the user interacts with the second button.

19. A method of streaming media content, comprising:

receiving, by a connected electronic device, a first streaming command from a wireless speaker, wherein the first streaming command is provided to the connected electronic device via a first communication link, the first communication link is a wireless communication link, the first streaming command was generated based on receipt of a first input provided to the wireless speaker by a user, the first streaming command consists of information other than information configured to identify a media-containing file, the wireless speaker comprises a first button, the first streaming command is provided from the wireless speaker when the user provides the first input to the first button, and the wireless speaker further comprises a second button that is configured to cause the generation of a second signal that comprises one or more standard device control commands when the user interacts with the second button;

determining, by the connected electronic device, to transmit a request to stream the contents of a first playlist from a first content server of a first content provider based on receiving the first streaming command;

transmitting the request to stream the contents of the first playlist to the first content server of the first content provider, wherein the transmitted request is provided to the first content server via a second communication link;

streaming at least a portion of the first playlist from the first content server to the connected electronic device via the second communication link; and streaming the at least a portion of the first playlist from the connected electronic device to the wireless speaker via the first communication link or a third communication link.

20. The method of claim 19, wherein the streaming the at least a portion of the first playlist from the connected electronic device to the wireless speaker further comprises:

retrieving a portion of the first playlist from memory of the connected electronic device; and streaming the portion of the first playlist from the connected electronic device to the wireless speaker via the first communication link or the third communication link.

21. The method of claim 19, wherein the second communication link comprises a direct connection between the connected electronic device and the first content server.

22. The method of claim 19, wherein transmitting the request to stream the contents of the first playlist to the first content server further comprises:
- delivering a first request to stream the contents of the first playlist to a content provider software application running on the connected electronic device, wherein the delivery of the first request to stream the contents of the first playlist is initiated by a control software application running on the connected electronic device; and
- then transmitting the first request to stream the contents of the first playlist to the first content server using the content provider software application.

23. The method of claim 19, further comprising:
- receiving, by the connected electronic device, a second streaming command from the wireless speaker, wherein
  - the second streaming command is provided to the connected electronic device via the first communication link,
- determining, by the connected electronic device, to transmit a request to stream the contents of a second playlist from a second content server of a second content provider based on receiving the second streaming command;
- transmitting the request to stream the contents of the second playlist to the second content server of the second content provider, wherein the transmitted request is provided to the second content server via a second communication link;
- streaming at least a portion of the second playlist from the second content server to the connected electronic device via the second communication link; and
- streaming the at least a portion of the second playlist from the connected electronic device to the wireless speaker via the first communication link or the third communication link.

24. The method of claim 23, wherein
- the first content provider is a first remote music service, and
- the second content provider is a second remote music service that is different from the first remote music service.

25. The method of claim 19, wherein the contents of the first playlist are selected by a user.

26. The method of claim 19, wherein streaming of the at least the portion of the first playlist from the connected electronic device to the wireless speaker is streamed using the third communication link.

* * * * *